US010287745B1

(12) United States Patent
Keigley

(10) Patent No.: US 10,287,745 B1
(45) Date of Patent: May 14, 2019

(54) WORK MACHINES INCLUDING AUTOMATIC GRADING FEATURES AND FUNCTIONS

(71) Applicant: ABI ATTACHMENTS, INC., Mishawaka, IN (US)

(72) Inventor: Kevin V. Keigley, Osceola, IN (US)

(73) Assignee: ABI Attachments, Inc., Mishawaka, IN (US)

( * ) Notice: Subject to any disclaimer, the term of this patent is extended or adjusted under 35 U.S.C. 154(b) by 0 days.

(21) Appl. No.: 15/943,070

(22) Filed: Apr. 2, 2018

Related U.S. Application Data

(63) Continuation-in-part of application No. 15/484,695, filed on Apr. 11, 2017.

(60) Provisional application No. 62/322,030, filed on Apr. 13, 2016.

(51) Int. Cl.
| | |
|---|---|
| *A01B 63/111* | (2006.01) |
| *E02F 3/84* | (2006.01) |
| *A01B 63/114* | (2006.01) |
| *E02F 3/815* | (2006.01) |
| *E02F 3/76* | (2006.01) |

(52) U.S. Cl.
CPC .......... *E02F 3/844* (2013.01); *A01B 63/114* (2013.01); *E02F 3/7604* (2013.01); *E02F 3/8157* (2013.01); *A01B 63/1112* (2013.01); *E02F 3/847* (2013.01)

(58) Field of Classification Search
CPC .. A01B 63/008; A01B 63/1112; E02F 3/8157; E02F 3/845; E02F 3/847
USPC ........ 172/4.5, 322, 323, 395, 430, 452, 506, 172/668
See application file for complete search history.

(56) References Cited

U.S. PATENT DOCUMENTS

| | | | |
|---|---|---|---|
| 2,358,298 A | 9/1944 | Benjamin | |
| 3,048,229 A | 8/1962 | Simpson | |
| 3,101,794 A | 8/1963 | Bechman | |
| 3,494,426 A * | 2/1970 | Studebaker | E02F 3/847 172/4.5 |
| 3,554,291 A | 1/1971 | Rogers | |
| 3,588,249 A | 6/1971 | Studebaker | |
| 4,062,634 A | 12/1977 | Rando et al. | |
| 4,356,644 A | 11/1982 | Harkness | |
| 4,807,131 A | 2/1989 | Clegg | |
| 4,820,041 A | 4/1989 | Davidson et al. | |
| 5,065,561 A | 11/1991 | Hadley | |
| 5,327,345 A | 7/1994 | Nielsen et al. | |
| 5,771,978 A | 6/1998 | Davidson et al. | |
| 5,983,511 A * | 11/1999 | Osaragi | E02F 3/847 33/290 |

(Continued)

*Primary Examiner* — Gary S Hartmann
(74) *Attorney, Agent, or Firm* — Taft Stettinius & Hollister LLP

(57) ABSTRACT

Work machines including automatic grading features and functions. One exemplary embodiment is a work machine including a chassis, ground contacting members rotatably coupled with the chassis and an actuator coupled with the chassis. A pole assembly extends above the chassis. A receiver is coupled with the pole assembly and structured to detect a wireless signal. An electronic controller is in operative communication with the receiver and the actuator, the electronic controller structured to adjust an actuator in response to a wireless signal detected by the receiver. The actuator is adjustable to vary position of the receiver and to vary position of a grading tool assembly coupled with a suspension.

10 Claims, 17 Drawing Sheets

(56) References Cited

U.S. PATENT DOCUMENTS

| | | | |
|---|---|---|---|
| 6,966,387 B2 | 11/2005 | Marriott, Jr. et al. | |
| 7,121,762 B2 | 10/2006 | Quanzi et al. | |
| 7,970,519 B2* | 6/2011 | Green | E02F 3/847 |
| | | | 701/50 |
| 8,634,991 B2* | 1/2014 | Douglas | E02F 3/847 |
| | | | 172/4.5 |
| 9,043,097 B2* | 5/2015 | Fehr | E02F 3/845 |
| | | | 701/50 |
| 9,332,687 B2 | 5/2016 | Keigley | |
| 9,883,621 B2* | 2/2018 | Keigley | A01B 63/008 |
| 2008/0011496 A1 | 1/2008 | Garrison et al. | |
| 2008/0087447 A1* | 4/2008 | Piekutowski | E02F 3/845 |
| | | | 172/3 |
| 2010/0023228 A1* | 1/2010 | Montgomery | E02F 3/845 |
| | | | 701/50 |
| 2011/0083657 A1 | 4/2011 | Leith | |
| 2013/0264080 A1* | 10/2013 | Keigley | A01B 63/008 |
| | | | 172/431 |
| 2016/0097183 A1* | 4/2016 | Kirsch | E02F 3/847 |
| | | | 701/50 |
| 2018/0116097 A1* | 5/2018 | Keigley | A01B 63/008 |
| 2018/0230674 A1* | 8/2018 | Keigley | A01B 31/00 |

* cited by examiner

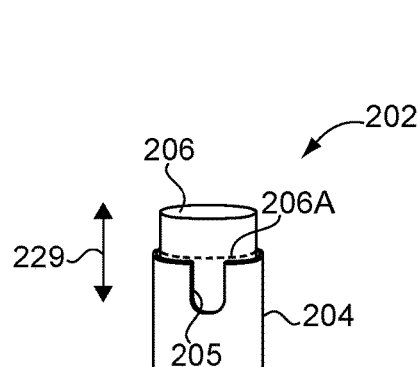
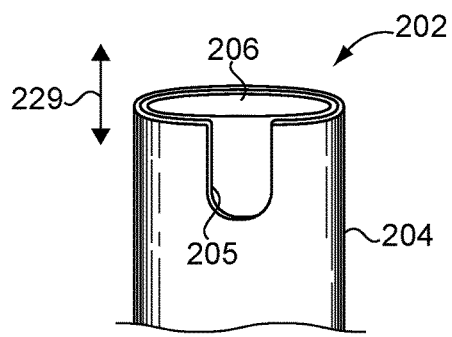
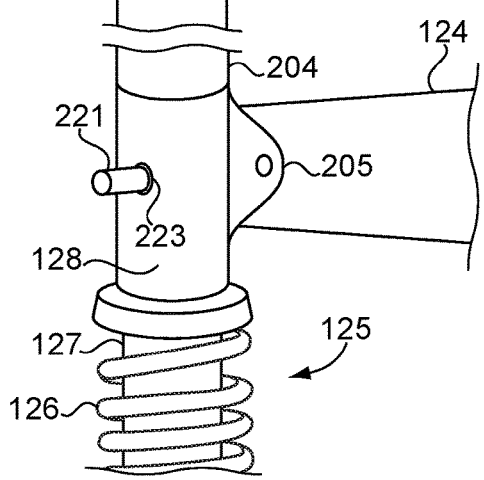
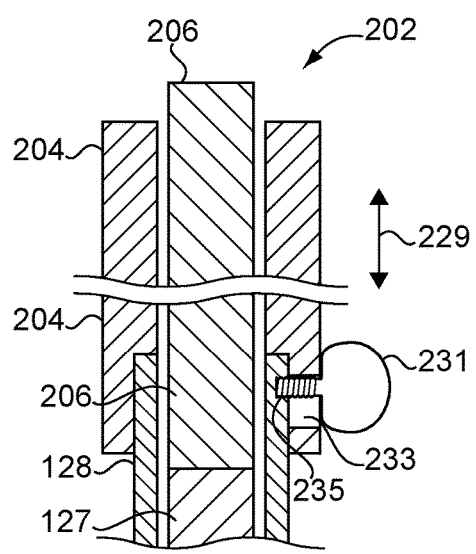
Fig.7
Fig.8
Fig.9

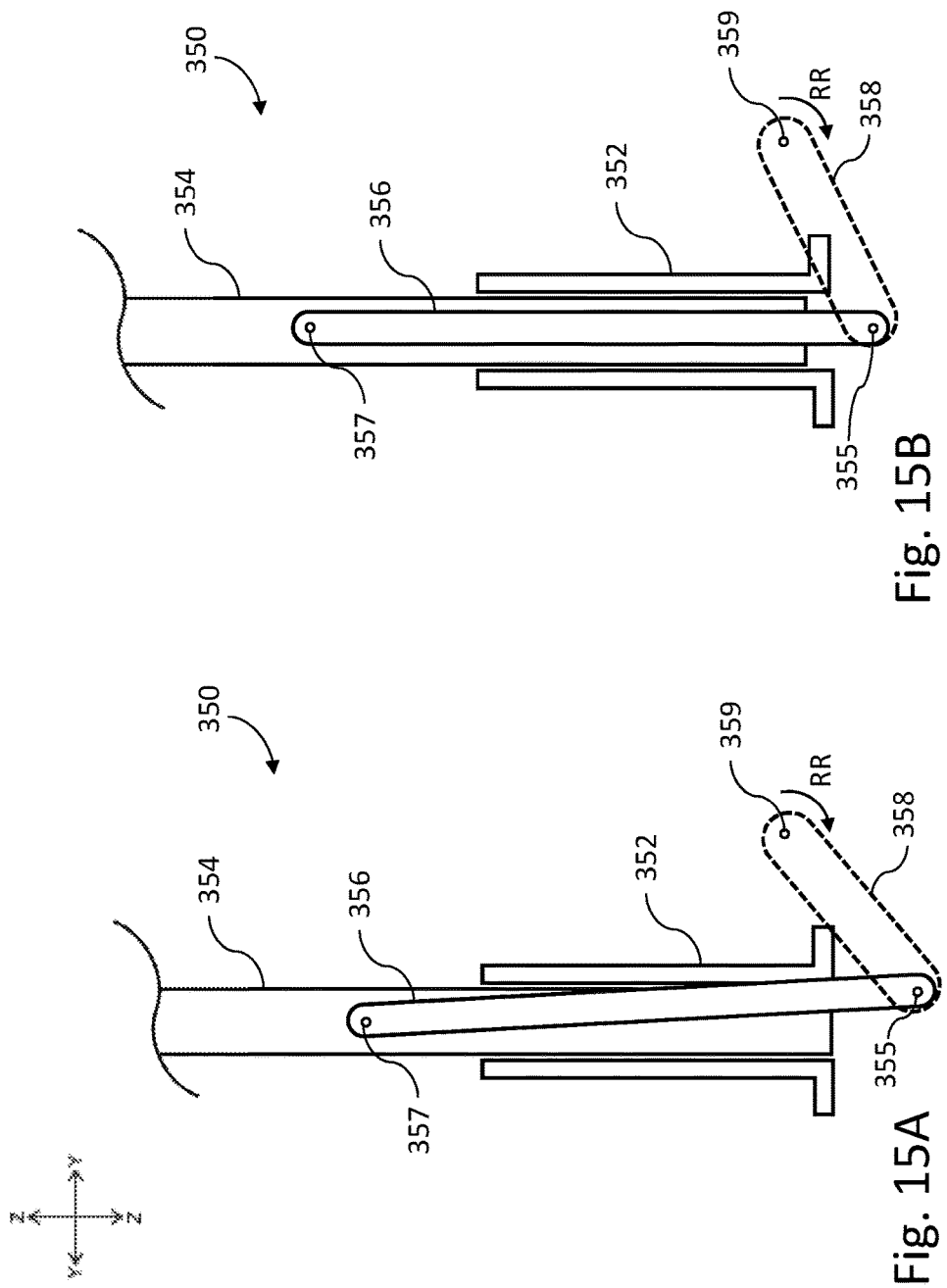

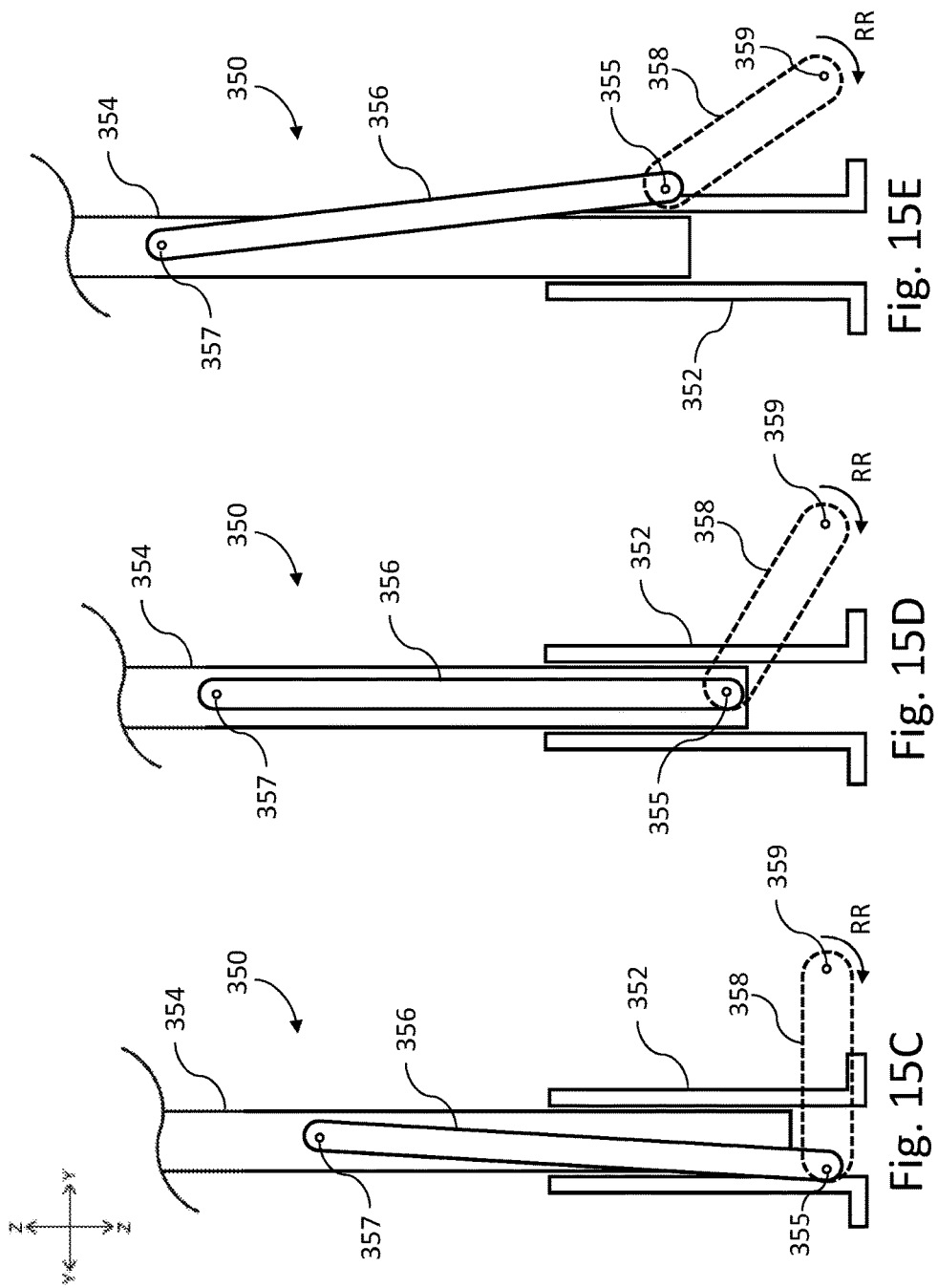

WORK MACHINES INCLUDING AUTOMATIC GRADING FEATURES AND FUNCTIONS

CROSS REFERENCE

This is a continuation-in-part of co-pending U.S. application Ser. No. 15/484,695 filed Apr. 11, 2017 which claims the benefit of and priority to U.S. Application No. 62/322,030 filed Apr. 13, 2016 both of which are hereby incorporated by reference.

BACKGROUND

The present application relates generally to work machines including automatic or automated grading features and functions. Grading of earth or substrate is a necessary part of landscaping, grounds keeping, building and construction projects. Systems which automatically control the depth or position of a grading tool without requiring selection by an operator have been proposed. Heretofore, such systems have suffered from a number of drawbacks and disadvantages. There remains a significant need for the unique apparatuses, systems and methods disclosed herein.

DISCLOSURE OF ILLUSTRATIVE EMBODIMENTS

For the purposes of clearly, concisely and exactly describing exemplary embodiments of the disclosure, the manner and process of making and using the same, and to enable the practice, making and use of the same, reference will now be made to certain exemplary embodiments, including those illustrated in the figures, and specific language will be used to describe the same. It shall nevertheless be understood that no limitation of the scope of the invention is thereby created, and that the invention includes and protects such alterations, modifications, and further applications of the exemplary embodiments as would occur to one skilled in the art.

SUMMARY OF THE DISCLOSURE

One exemplary embodiment is a work machine including a chassis, ground contacting members rotatably coupled with the chassis and an actuator coupled with the chassis. A pole assembly extends above the chassis. A receiver is coupled with the pole assembly and is structured to detect a wireless signal. An electronic controller is in operative communication with the receiver and the actuator. The electronic controller is structured to adjust an actuator in response to a wireless signal detected by the receiver. The actuator is adjustable to vary position of the receiver and to vary position of a grading tool assembly coupled with a suspension. Further embodiments, forms, objects, features, advantages, aspects, and benefits shall become apparent from the following description and drawings.

BRIEF DESCRIPTION OF THE DRAWINGS

FIG. 7 is a perspective view of a grading position indication system in a first operational state.

FIG. 8 is a perspective view of the grading position indication system of FIG. 7 in a second operational state.

FIG. 9 is side sectional view of a portion of the grading position indication system of FIG. 7.

FIGS. 15A-15E are schematic illustrations of certain aspects of the automatic grading system of FIG. 11 in different states of adjustment.

DETAILED DESCRIPTION OF ILLUSTRATIVE EMBODIMENTS

Figure 1:
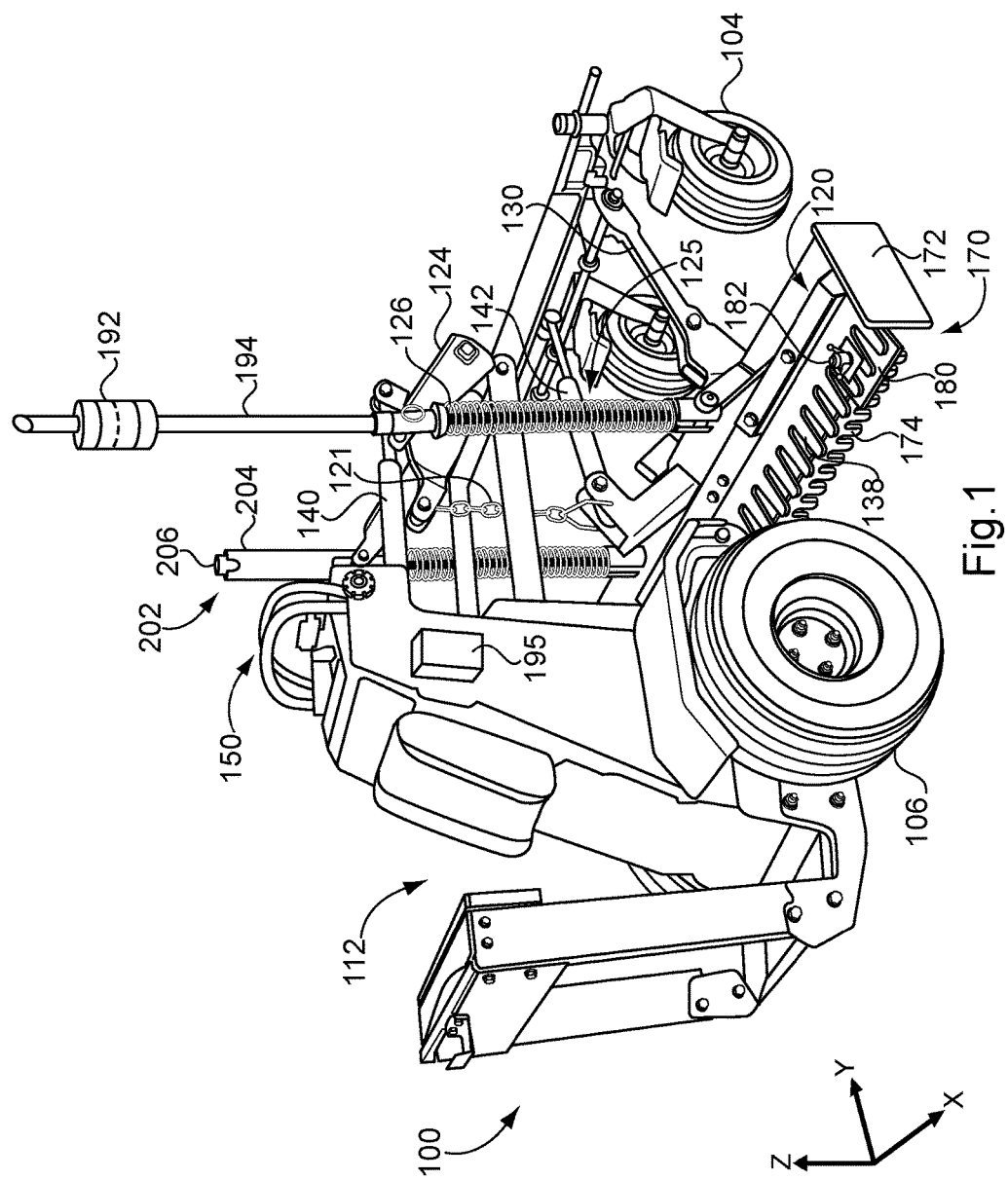
FIG. 1 is a perspective view illustrating certain aspects of an exemplary work machine including an automatic grading system.
Figure 2:
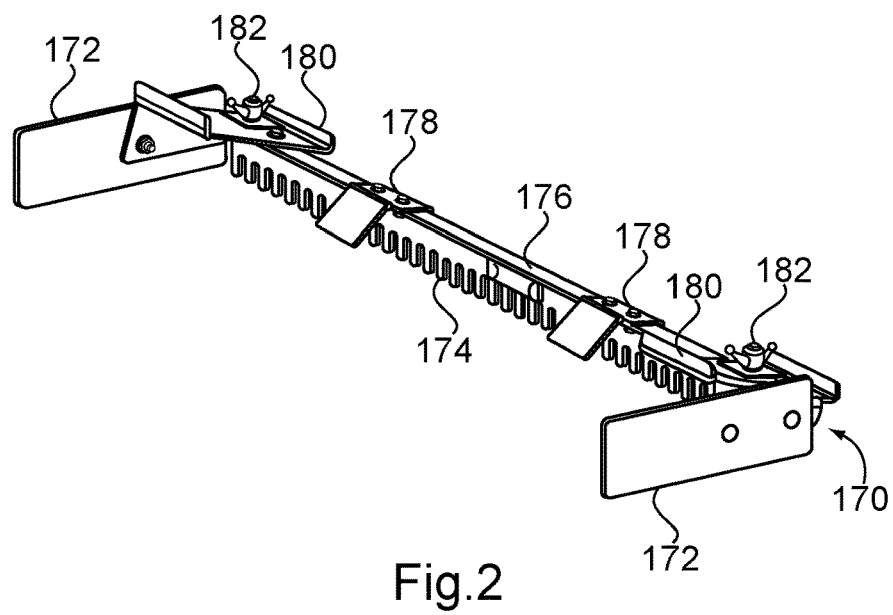
FIGS. 2-6 are perspective views illustrating certain components of the automatic grading system of FIG. 1 from alternate perspectives.
Figure 3:
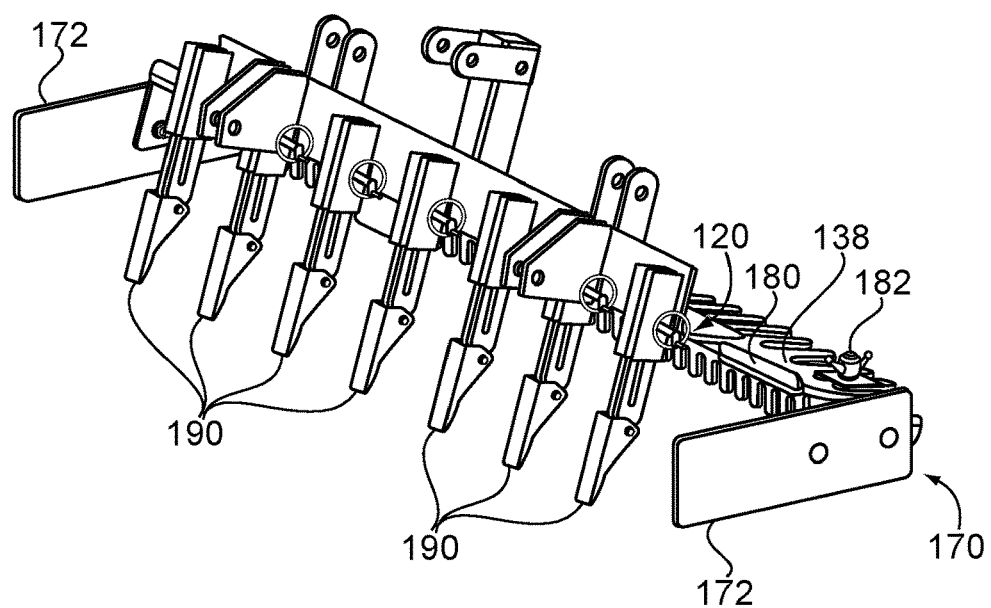
Figure 4:
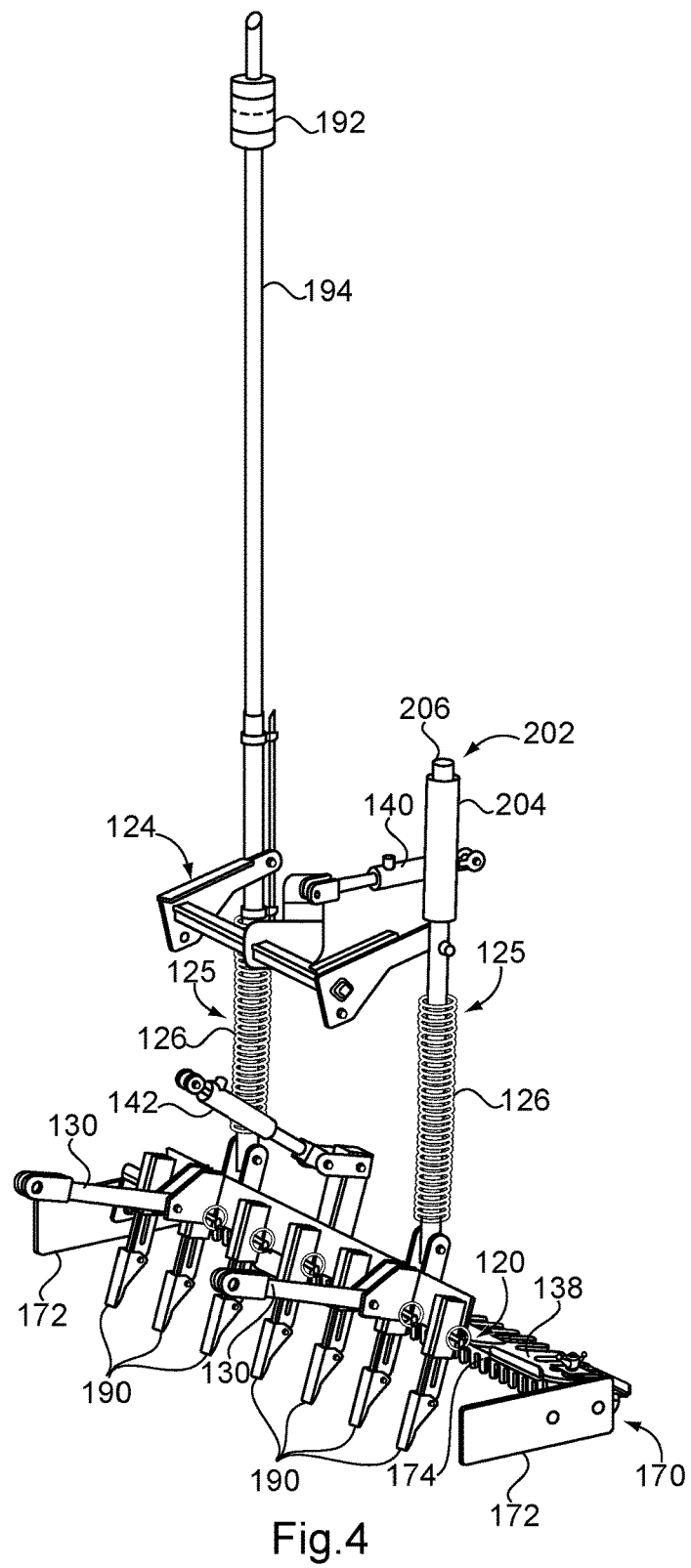
Figure 5:
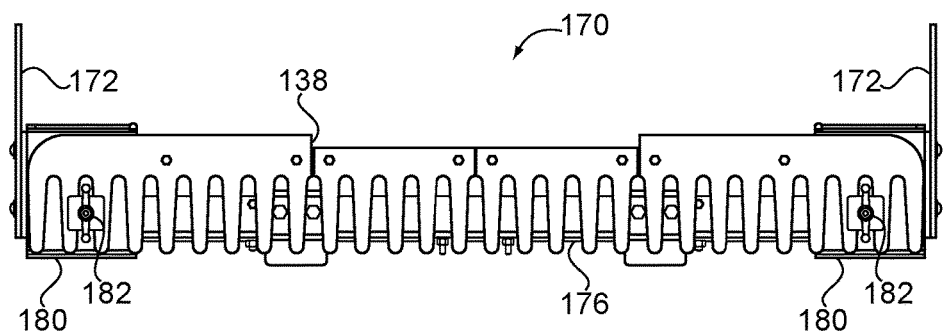
Figure 6:
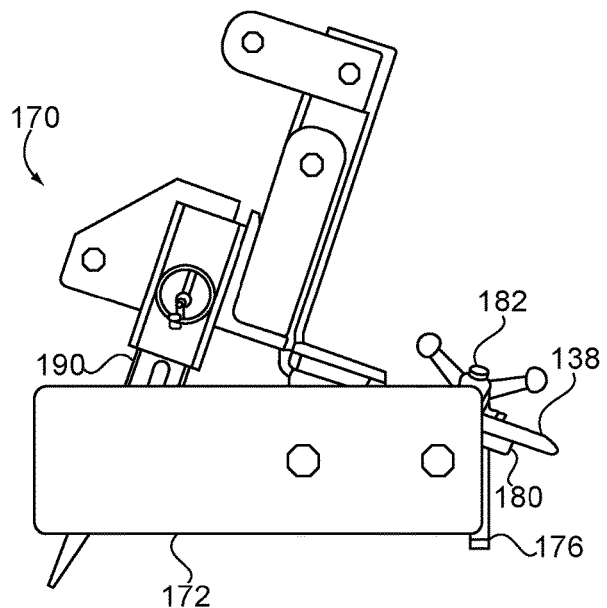
Figure 10:
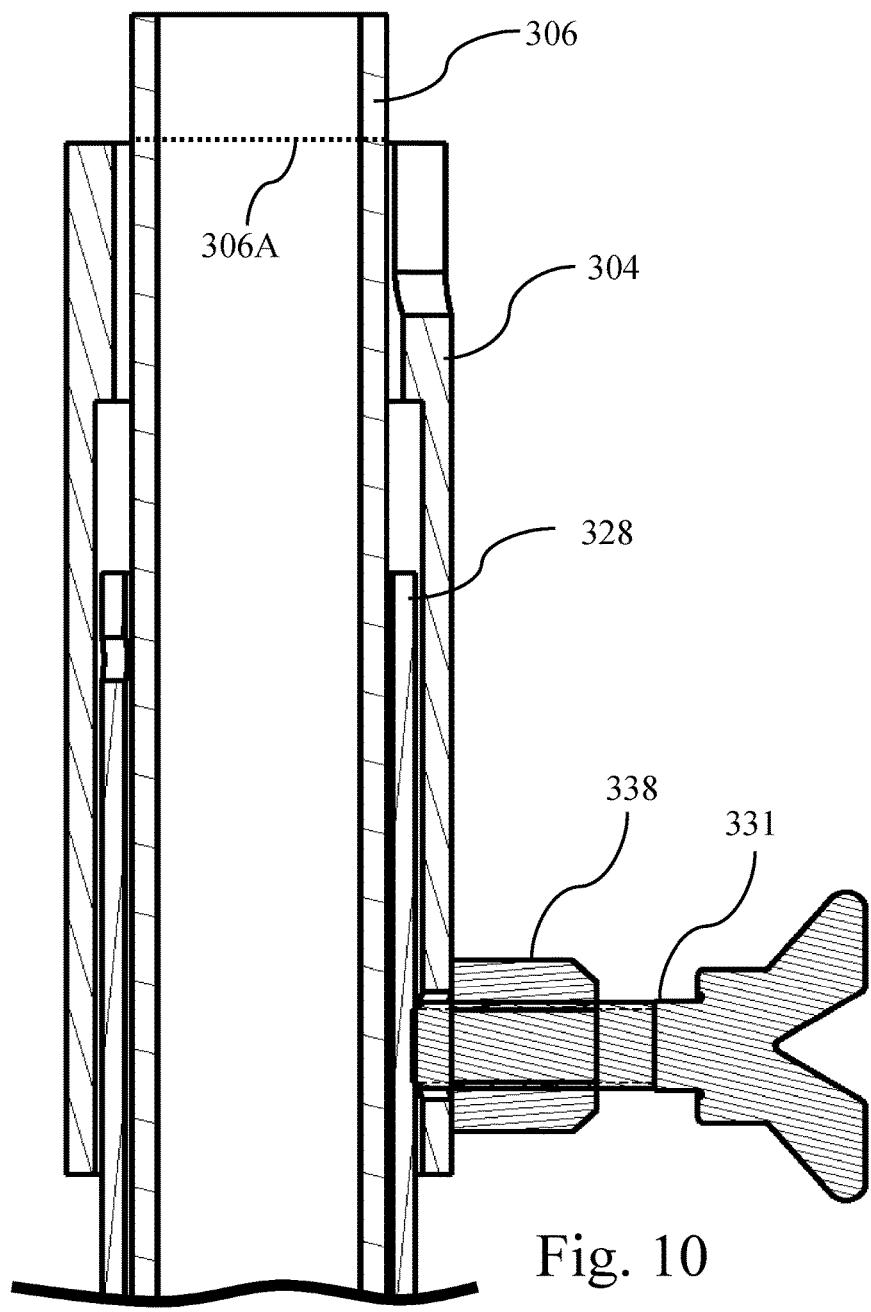
FIG. 10 is side sectional view of a portion of a grading position indication system of FIG. 7.
Figure 11:
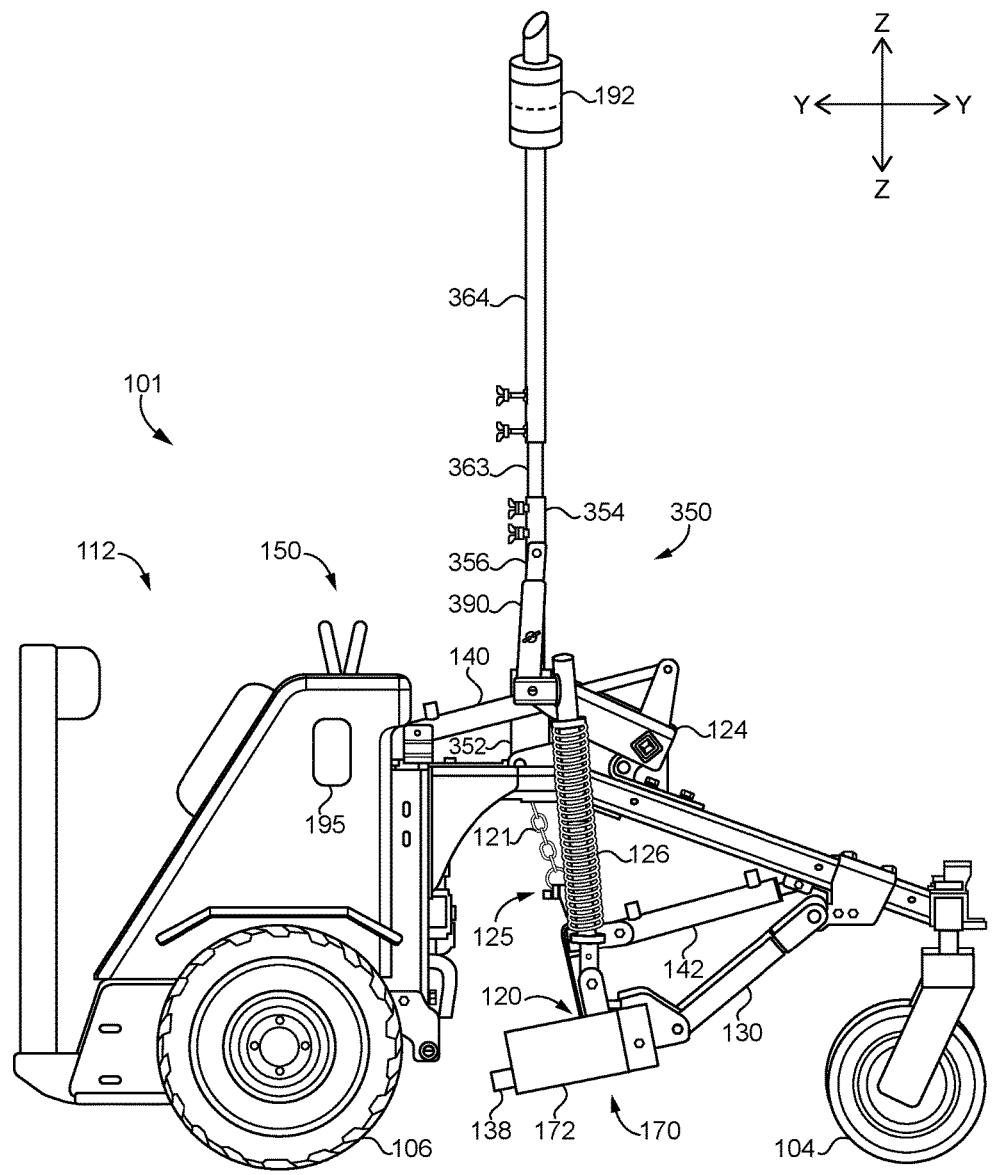
FIG. 11 is a side view illustrating certain aspects of an exemplary work machine including an automatic grading system.

With reference to FIG. 1 there is illustrated a perspective view of an exemplary work machine 100 operatively coupled with an automatic grading system. In the illustrated embodiments, work machine 100 is a light-duty work machine with a substantially zero turning radius. It shall be appreciated, however, that other types of work machines may also be utilized in connection with the automatic grading systems and components disclosed herein.

Machine 100 is one example of a self-propelled light duty work machine. In a preferred embodiment work machine 100 has a weight of about 1100 pounds and a propulsion system comprising a rated power of 18 hp or less. Additional embodiments comprise self-propelled light duty work machines including a propulsion system comprising a rated power of 25 hp or less, weighing 1500 pounds or less, or comprising both of said attributes. Further embodiments comprise self-propelled light duty work machines including a propulsion system comprising a rated power of 30 hp or less, weighing 2000 pounds or less, or comprising both of said attributes.

Work machine 100 includes a chassis supported by front wheels 104 and rear wheels 106 which contact a ground surface and support the chassis. In the illustrated embodiments the chassis is configured to provide an exemplary frame structure with which various work machine elements and tool elements are coupled. It shall be appreciated that the chassis of work machines according to other embodiments may comprise a variety of structures including frame-based chassis, unibody chassis, or other types of chassis or support structures that are configured to be supported by ground contacting wheels or other ground contacting members and coupled with one or more soil working tools.

In the illustrated embodiment the front wheels 104 of work machine 100 are configured as caster type wheels which preferably are rotatable 360 degrees relative to the chassis. It shall be appreciated that a variety of differently configured front wheels 104 may be utilized including, for example, front wheels provided on an axle, rack and pinion assembly, or other types of front end steering assembly and/or front end drive assembly. It shall be further appreciated that additional embodiments may include only a single front wheel, a greater number of front wheels or may include ground surface contacting elements other than wheels, such as treads or tracks. While the front wheels 104 are non-driven wheels in the illustrated embodiments, it shall be appreciated that other embodiments comprise one or more driven front wheels configured to provide at least part of the propulsion to the work machine.

In the illustrated embodiments the rear wheels 106 of work machine 100 are coupled with a machine prime mover. In a preferred embodiment the prime mover comprises an internal combustion engine configured to drive a hydraulic pump that is flow coupled with a hydraulic drive system configured to provide torque to the rear wheels 106. Exemplary hydraulic drive systems may include elements such as high pressure accumulators, low pressure reservoirs, secondary pumps, gearboxes, collectors and/or differentials. In other embodiments the prime mover is configured as an internal combustion engine configured to provide driving torque through an output shaft. In other embodiments the prime mover comprises an internal combustion engine and/ or an electric motor configured to provide output torque. The electric motor may be powered by a battery or other power storage source, by a generator driven by an internal combustion engine or a combination thereof.

In the illustrated embodiments each of the rear wheels 106 is independently controllable and drivable in a forward or reverse direction, though other embodiments may comprise different drive wheel arrangements, including front wheel drive arrangements, all-wheel drive and four wheel drive arrangements, to name several non-limiting examples. Certain embodiments may comprise only a single rear wheel or a greater number of rear wheels 106 or other ground contacting members. Certain embodiments may include additional driven ground contacting wheels, for example, two ground contacting wheels may be provided on truck structures provided on either side of and pivotally coupled with the work machine in a tandem walking arrangement, and each of the four overall ground contacting wheels may be independently driven by a hydraulic motor or an electric motor.

The chassis supports an operator station 112 which includes a standing platform and a guard rail positioned at the aft end of work machine 100 adjacent the standing platform. Operator controls 150 are positioned to be manipulatable by an operator occupying the operator station 112 in order to control movement or propulsion of the work machine 100 as well as the positioning of one or more tools carried by the work machine as further described herein. It shall be appreciated that operator control 150 may include one or more levers or other operator manipulatable controls that are operatively coupled with valves and hydraulic fluid lines to control one or more hydraulic actuators of the work machine. For clarity of illustration these features have not been depicted in the illustrated embodiments. Furthermore, in certain embodiments, the operator station 112 may comprise an operator seat instead of or in addition to a standing platform. In certain embodiments the operator station 112 may be omitted and the machine may be controlled remotely using a separate operator control station in wireless communication with a controller provided on the machine 100 and configured to control movement or propulsion of the machine 100 as well as the positioning of one or more tools carried by the work machine.

With reference to FIGS. 1-6, there are illustrated several views of various components of the exemplary automatic grading system which is operatively coupled with work machine 100 in the view of FIG. 1 and separately from various components of work machine 100 in the views of FIGS. 2-6. The automatic grading system includes a tool mount 120 which is operatively coupled with a grading tool assembly including finishing box 170 and scarifying shanks 190. In the illustrated embodiments, scarifying shanks 190 are attached to tool mount 120 and finishing box 170 is attached to finishing comb 138 which is in turn attached to tool mount 120 as is further described below. In this form, finishing comb 138 may be considered as both a tool component and a tool mount component. Other embodiments contemplate different configurations for tool mount 120 and the tool components coupled therewith, for example, finishing box 170 may be coupled directly with tool mount 120 or intermediately coupled to tool mount 120 by various other intermediate structures. Similarly, scarifying shanks 190 may be coupled with tool mount 120 in other locations or directly coupled with other components which are, in turn, coupled with tool mount 120. Furthermore, tool mount 120 may be provided with different dimensions and shapes as the illustrated form.

Finishing box 170 includes rear wall member 174 extending a distance along the width of the work machine 100 in the X-axis direction and side wall members 172 extending a distance along the length of the work machine 100 to a location forward from the rear wall in the Y-axis direction. Rear wall member 174 includes a lower toothed edge in the illustrated embodiments but may also be provided with a straight edge. Member 176 extends a distance along the width of the work machine 100 in the X-axis direction and is coupled with rear wall member 174. Members 178 are attached to member 174 and are positioned at a distance from one another and structured with angled portions to provide a surface over which the wheels or other ground contacting members of work machine 100 can travel to facilitate work machine 100 driving over finishing box 170 during connection or disconnection of the grading tool assembly. Members 180 are attached to member 176 and side wall members 172. The bottom surface of members 180 is configured to rest against finishing comb 138. Attachment members 182 include a portion structured and positioned to pass through a gap intermediate teeth of finishing comb 138 and an attachment mechanism 182 structured to selectably clamp members 180 to finishing comb 138. In the illustrated embodiments, attachment mechanism 182 is structured to include nut with handles to facilitate attachment of the finishing box 170 to the comb 138 without specialized tools, or with minimal use of tools such as a pipe extension for applying additional torque to the attachment mechanism.

Scarifying shanks 190 are coupled with tool mount 120 and positioned forward from the rear wall member in the Y-axis direction and between the side wall members in the X-axis direction. Scarifying shanks 190 are one example of ground penetrating members which may be provided in a grading tool assembly. During operation of the grading tool assembly, scarifying shanks penetrate the ground surface ahead of rear wall member 174 and disrupt and loosen the earth through which they path. Rear wall member 174 and side wall members 172 form a container structured that collects and moves the loosened earth.

By varying the height of the grading tool assembly in the Z-axis direction, finishing box 170 and scarifying shanks 190 can be utilized to grade the underlying ground surface to a selectably height. By varying the pitch of the grading tool assembly relative to the X-Y plane, the amount of earth collected and released by finishing box 170 can be varied. By adjusting the pitch so that end wall member 174 rotates toward the earth being graded, finishing box 170 can be adjusted to increase earth collection and transport. By adjusting the pitch so that end wall member 174 rotates away from the earth being graded, finishing box 170 can be adjusted to decrease earth collection and transport. It shall be appreciated that pitch adjustment can occur while maintaining a given height adjustment or concurrently with a height adjustment as further described herein.

During pitch adjustment of the grading tool assembly the depth of penetration into the earth of scarifying shanks 190 will also vary. By adjusting the pitch so that end wall member 174 rotates toward the earth being graded, scarifying shanks 190 rotate so that they penetrate the earth to a lesser depth (or are extracted entirely). The coordinated rotation of finishing box 170 and scarifying shanks 190 in this direction reduces earth loosening and increases earth transport. This permits increases in earth transport while also reducing propulsion opposing force attributable to the scarifying shanks 190. By adjusting the pitch so that end wall member 174 rotates away from the earth being graded, scarifying shanks 190 rotate so that they penetrate the earth to a greater depth. The coordinated rotation of finishing box 170 and scarifying shanks 190 in this direction increases earth loosening and decreases earth transport. This permits increases in earth disruption while also reducing propulsion opposing force attributable to the finishing box 170.

Tool mount 120 and the grading tool assembly coupled therewith including finishing box 170 and scarifying shanks 190 are moveable relative to the chassis of work machine 100 in several manners including translational movement generally in the direction of the Y-axis, translational movement generally in the direction of the Z-axis, and rotational movement about an axis generally parallel with the X-axis direction. Tool mount 120 is coupled with an actuator 142 at a pivotable coupling. Actuator 142 is also coupled with the chassis of work machine 100 at a pivotable coupling. In the illustrated embodiments actuator 142 is configured as a hydraulic cylinder which is laterally expandable and contractible generally in the Y-axis direction. The operator controls 150 may be configured to control the supply of pressurized hydraulic fluid to actuator 142 to control its position.

Tool mount 120 is connected to rocker 124 by a chain 121. Rocker 124 is coupled with actuator 140 at a pivotable coupling. Actuator 140 is also coupled with the chassis of the work machine 100 at a further pivotable coupling. In the illustrated embodiments actuator 140 is configured as a hydraulic cylinder which may be controlled in the same or similar fashion as actuator 142. It shall be appreciated that either or both of actuators 140 and 142 may be provided in different configurations, for example, as ratchets, top links or other actuators configured to provide appropriate displacement and force. It shall further be appreciated that either or both of actuators 140 and 142 may be omitted in certain embodiments. In such embodiments vertical adjustment of a tool mount is preferably, though not necessarily, provided by actuators configured to adjust other structural elements of a machine, for example, adjustable wheel suspension elements configured to raise or lower a chassis or other structure supporting, directly or indirectly a tool mount, or via a variety of other actuators.

In the illustrated embodiments actuator 140 is selectably controllable to expand and contract in the Y-axis direction effective to cause rocker 124 to rotate relative to the chassis about an axis parallel with the X-axis direction. Rotation of the rocker 124 is effective to raise and lower the tool mount 120 with the chain 121 over a first predetermined range from a maximum height to the point at which the support wheels 104, 106 contacts the ground surface underlying the machine 100. Support wheels 104, 106 are structured to ride along the underlying ground surface and limit further downward motion of the tool mount 120 and structured coupled thereto while concurrently allowing further rotation of the rocker 124 to compress or decompress the springs 126 or other elements of suspension 125. Thus, rotation of the rocker 124 is effective to vary the amount of spring action force applied to the tool mount 120 by varying the compression of springs 126 without substantially changing the Z-axis position of the tool mount 120. The suspension 125 accommodates movement of the tool mount in response to external force applied thereto, for example, if the tool mount contacts an obstruction such as a rock or other structure located in a soil medium being worked.

It shall be appreciated that chain 121 is one example of a weight lifting structure that may be utilized to raise and lower a soil working tool or tool mount. Structures such as cables, jointed linkages and other structures that limit relative displacement of a tool relative to a support structure to allow lifting through actuation in one direction, and deform, bend, flex, move or otherwise accommodate movement. It shall be further appreciated that chain 121 (or other lifting member(s)) may be to provide different and variable preloading of the springs or compressible members of suspension 125.

Actuator 142 is selectably controllable to expand and contract generally in the Y-axis direction effective to cause tool mount 120 to rotate relative to the work machine about an axis generally parallel with the X-axis direction as indicated by arrow RM. In this manner the pitch of the tool mount X-Y plane may be varied. This rotation can be utilized to rotate the grading tool assembly (raising one end and lowering the other) relative to the underlying ground surface and to control the force it applies to the underlying ground surface in the Z-axis direction.

Tool mount 120 is further coupled with a suspension 125 by a pivotable coupling. The suspension 125 is in turn connected to rocker 124 at a pivotable coupling. Rocker 124 is further coupled with the chassis at a pivotable coupling. In the illustrated embodiments the suspension 125 is configured as a pair of telescoping cylinders in combination with springs 126 which are compressible between spring mounts through relative motion of the telescoping cylinders. It shall be appreciated that a variety of other suspensions may be utilized in various embodiments in addition to or instead of the illustrated configuration including shock absorbers, elastomeric suspension elements, compressible members, pneumatic suspension elements, hydraulic suspension elements, other spring arrangements and combinations of the foregoing and/or other suspension elements. It shall be further appreciated that a variety of springs and spring mounts may be utilized. In the illustrated embodiments springs 126 are helical and the spring mounts are crimped or compressed in place relative to respective shafts or cylinders of a telescoping assembly. In certain embodiments the spring mounts may alternatively or additionally be welded, bonded, bolted or otherwise fixedly coupled with respective suspension elements. Certain embodiments comprise spring mounts adjustably coupled with respective suspension elements, for example, through an axial threaded connection which may utilize one or more lock nuts or other locking members, or by a set screw, pin or bolt.

The tool mount 120 is further coupled with a pulling linkage 130 at a pivotable coupling which rotates generally about an axis in parallel with the X-axis direction. Pulling linkage 130 is coupled with the chassis of the work machine at a pivotable coupling which rotates about an axis in parallel with the X-axis direction. Pulling linkage is configured to provide a force vector component to the tool assembly in the forward or reverse Y-axis direction as the machine is propelled forward or backward. A force vector component generally in the Y-axis direction may also be provided, for example, during turning of the machine. Regardless of the particular direction, the pulling linkage provides one or more force vector components providing working force to the tool assembly. Furthermore, the rotation permitted by pivotable couplings between pulling linkage and the chassis of the work machine accommodates both adjustment of the height and pitch of the tool assembly relative to the X-Y plane.

The above-described motion of tool mount 120 and the grading tool assembly can be controlled in an automated manner by an electronic control system. In the illustrated embodiments, the electronic control system includes a receiver 192 coupled with suspension element 125 by a positioning pole 194 and an electronic controller 195 in operative communication with receiver 192, actuator 140, and optionally with actuator 142. Receiver 192 is moveable relative to and can be fixed in place in a plurality of positions along pole 194 in the Z-axis direction. This adjustability allows the receiver to be positioned relative to a reference signal source such as a rotating laser. Accordingly, in certain forms receiver 192 may be structured as a laser receiver adapted to receive a laser beam output by a laser level apparatus, for example, a rotary laser, a single plane laser, a dual plane laser, a conical laser or a GPS laser. In other forms receiver 192 may be provide as or in combination with other types of wireless signal sources and signal detectors or receivers.

Electronic controller 195 may be structured as a microprocessor-based or microcontroller-based electronic control unit and may include wired input circuitry for receiving input from receiver 192 and/or wireless communication circuitry for receiving input from receiver 192. Electronic controller 195 may be configured to evaluate a reference signal, such as a laser beam received by receiver 192, and to determine actuator position adjustment commands based upon the received reference signal(s) and one or more operator-specified grading commands input to the electronic controller 195. The operator-specified grading commands input to the electronic controller may include a Z-axis grade elevation and a grade angle and direction which may be defined relative to the X-Y plane or another reference plane. Electronic controller may further include output circuitry adapted to provide commands to one or more actuators for adjustment of a working tool in accordance with the determined actuator position adjustment commands, for example, commands to operate a hydraulic actuator or a proportion valve of a hydraulic actuator or an electric actuator.

Electronic controller 195 may be structured to output control commands to adjust actuator 140 which is effective to simultaneously adjust the position of the receiver in the Z-axis direction and one or both of the position of the grading tool assembly in the Z-axis direction and the force applied to suspension 125 in the Z-axis direction. The degree to which the Z-axis position of the grading tool and/or the Z-axis force applied to suspension 125 are varied depends upon whether and the degree to which the grading tool assembly encounters resistance force in response to the automated control of actuator 140 by electronic controller 195. The force applied to suspension 125 in the Z-axis direction is effective to apply force to the grading tool assembly in the Z-axis direction thereby providing working force on the underlying ground surface toward the operator-specified grading commands. Additionally, it shall be appreciated that receiver 192 and pole 194 are fixedly coupled to a structure of suspension 125, such as suspension member 128, which continues to move in response to adjustment of actuator 140 as springs 126 is compressed and that motion of the grading tool assembly and suspension elements fixedly coupled thereto, such as suspension member 127, can de-couple from and vary relative to the motion of receiver 192 and pole 194 due to compression of springs 126.

In a system rigidly or fixedly interconnecting a grading tool and a receiver, the aforementioned motion and force application would result in motion of the grading tool assembly of a magnitude and direction equivalent to the motion of receiver 192. In contrast, in the illustrated embodiment the suspension 125 is compressible to vary the distance between the receiver 192 and the grading tool assembly depending upon the working force encountered by the grading tool assembly. Surprisingly, allowing the depth or position of the grading tool to vary from the position that would normally be selected using the electronic grading system has been determined to provide unique benefits and operability for light duty work machines notwithstanding the fact that it would appear contrary to the goal of automated grading depth positioning. By selecting the compression characteristics of suspension 125 relative to the weight and power of the work machine, the compression may be effective to avoid exceeding the propulsion system power output and stopping the work machine. This additional degree of freedom provides a synergistic functionality allowing automatic adjustment of the position of the grading tool assembly while also permitting variation from the automatic depth to avoid undesired stoppage of the work machine.

An additional degree of freedom is provided by actuator 142 which may be controlled to vary grading tool assembly pitch concurrently with the automatic height adjustment of the actuator 140. This allows the operator to manipulate operator control 150 to vary the pitch of the grading tool assembly effective to vary the relative earth disrupting and earth moving functions of the grading tool assembly while simultaneously providing automatic adjustment of the overall grading depth as described above. It shall be appreciated that operator pitch adjustment may be performed concurrently with automatic height/depth adjustment by the electronic control system thus providing the operator with the ability to adjust the earth disruption and transport characteristics of the finishing box 170 while concurrently automatically controlling toward a uniform grading height. Such automated adjustment may be in response to an operator-input grade angle or elevation provided to electronic controller 195.

With reference to FIGS. 7-10 there are illustrated further details of sighting gauge system 202 and its interconnection with suspension 125. Sighting gauge system 202 includes an outer member 204 and an inner member 206 which is moveable relative to inner member 206 in the direction generally illustrated by arrow 229. Outer member 204 is structured to be adjustably coupled with suspension member 128 at one end and to slidably receive inner member 206. Outer member 204 is adjustably coupled with suspension member 128 by a set screw 231 which passes through an opening 233 defined in outer member 204 and engages a threaded opening provided in suspension member 128. Set screw 231 may be tightened to retain outer member 204 in a fixed position relative to suspension member 128 and loosened to permit adjustment of outer member 204 relative to suspension member 128 in the direction generally indicated by arrow 229. It shall be appreciated that sighting gauge system 202 is one example of a grading position indication system which is structured to provide a visually perceptible qualitative and quantitative indication of a difference between an automatic or automated commanded grading position for a grading tool and an actual position for the grading tool. In certain applications, sighting gauge system 202 is visible not only by a tool operator but also by bystanders up to 100 feet or greater distant from the vehicle.

The range of adjustability of outer member 204 relative to suspension member 128 may be defined by the upper and lower surfaces of opening 233 which come into contact with set screw 231 at respective maximum and minimum vertical adjustment positions. In some forms a gap may remain between outer member 204 and suspension member 128 in the downward most position. In some forms the stepped inner surface of outer member 204 may come into contact with suspension member 128 in the downward most position. It shall be appreciated that the extent and position of opening 233 and the portion of outer member 204 in which it is provided may vary from the illustrated embodiment, for example, the opening 233 may extend downward in a greater distance to allow increased range of adjustment. The adjustable mating and coupling between outer member 204 and suspension member 128 may also comprise additional or alternate coupling and fixation structures such as additional or alternate threaded connections, detent connections, and removable pin connections to name several examples. For example, in the embodiment illustrated in FIG. 10, set screw 331 is threaded into collar 338 which extends from outer member 304. In this embodiment set screw 331 may be tightened to provide contact force against the outer surface of suspension member 328 to fix outer member 304 in place relative to suspension member 328 and loosened to permit outer member 304 to move relative to suspension member 328. It shall be appreciated that outer set screw 331, outer member 304 and suspension member 328 correspond generally to set screw 231, outer member 204 and suspension member 128 in regards to their functionality and relationship to other structures of the overall apparatus and system. It shall be further appreciated that the embodiment illustrated in FIG. 10 may be provided in connection with the other features of work machine illustrated in FIGS. 1-9 as an alternate form of sighting gauge system 202.

Inner member 206 is structured to abut suspension member 127 at one end and to slide relative to outer member 204. Inner member 206 may be maintained in abutment with suspension element by its own weight and/or by a mechanical coupling structure. In some forms inner member 206 may be fixed to or integrally formed with suspension member 127 to provide a unitary structure. Inner member 206 is structured to move with suspension member 127 effective to vary the relative position between inner member 206 and outer member 204. This variation in relative position provides a visually perceptible indication of a measurement of the extent to which a desired or commanded grading result needs or remains to be accomplished. In the illustrated embodiment, inner member is configured to move between a lower position which is illustrated in FIG. 8 and is also denoted by dashed line 206A in FIG. 7, and an extended upper position which is illustrated in FIGS. 7 and 9. With respect to the embodiment illustrated in FIG. 10, inner member 306 corresponds to inner member 206 and is moveable between the position illustrated in FIG. 10 and the position generally indicated by dashed line 306A which corresponds to dashed line 206A.

As discussed above in connection with FIGS. 1-6, springs 126 of suspension 125 may be compressed during operation of work machine 100 when electronic controller 195 automatically adjusts actuator 140 downward. During such adjustment, the relative positions of suspension member 128 and suspension member 127 may vary. Since suspension member 128 is fixedly (through rotatably) coupled with actuator 140 by rocker 124, its position varies in a generally fixed relationship to the motion of actuator 140. On the other hand, suspension member 127 is non-fixedly coupled with actuator 140 and may travel upward relative to suspension member 128 in response to compression of springs 126. The relative position between suspension member 127 and suspension element 128 is correlated to and may be substantially equal to a measurement of the extent to which the grading position that is commanded by controller 195 has actually been accomplished. The indication of a measurement of the extent to which a desired or commanded grading result needs or remains to be accomplished is thereby visible through the relative position of outer member 204 and inner member 206 or outer member 304 and inner member 306.

As illustrated in FIG. 7, a suspension lockout feature is provided and may be selected by inserting retaining pin 221 into an opening 223 formed in suspension member 128 and an opening formed in suspension element 127 disposed within suspension member 128. The opening formed in suspension element 127 may be selected and sized such that the alignment with opening 223 formed in suspension member 128 occurs when the suspension 125 is substantially uncompressed. At the same time, the position of outer member 204 may be adjusted to be substantially even with the upper extremity of inner member 206. In this configuration the upper end surface of inner member 206 will extend upward from the upper end surface of outer member 204 when the suspension 125 is compressed and will lie substantially even with the upper end surface of the outer member 204 when the suspension is relaxed or fully extended. This configuration provides a visual indication of the extent of compression of the suspension 125 which is visually perceptible by the operator of work machine 100 as well as operators of other work machines in the vicinity thereof. In certain forms, the lockout feature may be structured such that retaining pin 221 passes entirely through outer member 204 and inner member 206. Preferably the lockout feature is employed when the desired grade is nearly completed, for example, within about ¼ inch, to avoid the possibility that premature lockout may cause the tool to lose traction. In certain forms retaining pin 221 may be configured to outer member 204 and inner member 206 at an angle relative to the vertical surfaces of outer member 204 and inner member 206. An external holder may be provided to store retaining pin 221 when the lockout mode is not engaged. Clips or retention rings may also be engaged with retaining pin 221 to maintain retaining pin 221 in the installed position and prevent inadvertent removal. It shall be appreciated that retaining pin is one example of a suspension lockout member adapted to maintain suspension 125 in a fixed position. Additional examples of suspension lockout members include screws, detent mechanisms, clips, collars bolts and other structures adapted to engage suspension member 128 and suspension member 127 and maintain them fixed relative to one another.

Sighting gauge system 202 may be calibrated or adjusted by an operator in conjunction with the set-up of work machine 100 and the provision of operator-specified grading commands input to the electronic controller 195. The calibration may be performed such that the suspension 125 assumes its relaxed or extended position when the position corresponding to the operator-specified grading commands has been achieved. In such a calibration state, the position of inner member 206 or 306 relative to outer member 204 or 304, respectively, provides an indication of the distance between the current grading state of the underlying ground surface and the desired grading state of the underlying ground surface as defined by the operator-specified grading commands. It shall be further appreciated that this indication is both qualitative and quantitative in that the distance that inner member 206 or 306 extends above outer member 204 or 304 corresponds to and may be calibrated to be substantially identical to the depth of grading that must still be performed to provide the desired grading state of the underlying ground surface as defined by the operator-specified grading commands. Thus the relative position of inner member 206 or 306 relative to outer member 204 or 304 provides a visually perceptible indication of the progress toward an operator-specified grading state of the underlying grounds surface and this indicia is perceptible to the operator of the work machine as well as in a line of sight path in all directions, for example, by a bystander within 100 feet or more.

Outer member 204 includes a sighting gauge notch 205 which permits the relative position of inner member 206 and outer member 204 to be visually perceived by an operator or worksite observer even when inner member 206 is positioned below outer member 204. While outer member 204 is illustrated as having one U-shaped sighting gauge notch, it shall be appreciated that additional sighting gauge notches may be provided at other locations about outer member 204 to provide visibility from additional viewing positions. Furthermore, the size and shape of the sighting gauge notch may vary from the illustrated embodiments and may be, for example, a V-shaped notch, a rectangular notch, or a series of holes or apertures provided along a length of outer member 204. It shall be further appreciated that shading or color contrast between inner member 206 and outer member 204 may be provided to enhance the visual perceptibility of their relative positioning and changes thereof.

It shall be appreciated that the visually perceptible indicia discussed above provides unique synergistic benefits in combination with the aforementioned automated or automatic height or depth adjustment capabilities. Such features allow the operator of a first work machine, such as work machine 100, to judge the extent to which a desired depth or height position commanded by the automatic or automated depth or height adjustment is being reached and a corresponding extent to which the suspension assembly is being compressed thereby providing an ability to determine and judge progress toward an operator defined grading state of the underlying ground surface. The visually perceptible indicia are further available to and perceivable by operators of additional work machines in the vicinity. Operators of these additional work machines my thereby take advantage of the automated grading depth control features of the first work machine without requiring those features and the apparatuses and systems provided on them to be provided on the additional work machines. Furthermore, coordinated operation of the first work machines and additional work machines of different types is enabled by this combination of features and can improve the speed and efficiency with which a grading operation may be completed.

In one example process, an athletic field or arena, such as a baseball diamond or equine arena, may be constructed or refurbished by grading with a first work machine such as work machine 100 configured to provide automated operator specified grade characteristics and by one or more additional heavier duty work machines such as a front loader, bucket vehicle or other earth moving equipment. The operators of the additional heavier duty work machines may observe the visually perceptible indicia and may qualitatively and quantitatively judge and determine progress toward the operator defined final grading state. The operators of the additional heavier duty work machines may therefore determine and judge areas of the underlying ground surface where additional grading is needed and may selectively and strategically utilize the greater earth moving capabilities afforded by heavier duty machines to target those areas where ground surface moving or removal is needed to achieve the desired grading result. Once a certain amount of progress is made, e.g., the target grade has been established to about ¼ inch, the lockout feature of the first grading tool may be engaged and the first grading tool may be utilized to complete a final finish grading operation to achieve the desired grading result.

With reference to FIGS. 11-14, 15A-15E and 16A-16E, there are illustrated several views of certain aspects of an exemplary work machine 101 operatively coupled with an exemplary automatic grading system. Work machine 101 and its exemplary automatic grading system include a number of features that are the same as or similar to the features described above in connection with work machine 100 and its exemplary automatic grading system, and a number of such features are indicated with like reference numerals in both work machine 100 and work machine 101. While certain such common features are illustrated in the drawings and described below, it shall be appreciated that all aspects, alternatives and variations described or illustrated in connection with work machine 100 also apply to and may be embodied in work machine 101 unless described to the contrary. Work machine 101 and its exemplary automatic grading system also include certain aspects which differ or vary from those of work machine 100 a number of which are illustrated in connection with FIGS. 11-14, 15A-15E and 16A-16E and described below.

Like the automatic grading system of work machine 100, the automatic grading system of work machine 101 includes a tool mount 120 which is connected to rocker 124 by a chain 121. Rocker 124 is coupled with actuator 140 at a pivotable coupling 408 which is visible in the figures illustrating work machine 101 and described above although not visible in the figures illustrating work machine 100. Actuator 140 is also coupled with the chassis of the respective work machine 100 or 101 at a further pivotable coupling and is selectably controllable to expand and contract in the Y-axis direction effective to cause rocker 124 to rotate relative to the chassis about an axis parallel with the X-axis direction. Rocker 124 includes outer members 402 which are coupled with suspension 125. Rocker 124 also includes a shaft member 404 which extends between and is coupled with the outer members and is coupled with pivotable coupling 408. Rocker 124 further includes an actuator connector 406 which is pivotally coupled with shaft member 404 and actuator 140. Rocker 124 further includes a lifting connector 358 which is pivotally coupled with shaft member 404 and chain 121.

As described above, rotation of the rocker 124 is effective to raise and lower the tool mount 120 with the chain 121 over a first predetermined range from a maximum height to the point at which the support wheels 104, 106 contacts an underlying ground surface and are structured to ride along the underlying ground surface and limit further downward motion of the tool mount 120 and structured coupled thereto while concurrently allowing further rotation of the rocker 124 to compress or decompress the springs 126 or other elements of suspension 125. Thus, rotation of the rocker 124 is effective to vary the amount of shock absorption force applied to the tool mount 120 by varying the compression of springs 126 without substantially changing the Z-axis position of the tool mount 120. The suspension 125 accommodates movement of the tool mount in response to external force applied thereto, for example, if the tool mount contacts an obstruction such as a rock or other structure located in a soil medium being worked.

Actuator 142 is selectably controllable to expand and contract generally in the Y-axis direction effective to cause tool mount 120 to rotate relative to the work machine about an axis generally parallel with the X-axis direction as indicated by arrow RM. In this manner the pitch of the tool mount X-Y plane may be varied. This rotation can be utilized to rotate the grading tool assembly (raising one end and lowering the other) relative to the underlying ground surface and to control the force it applies to the underlying ground surface in the Z-axis direction. Tool mount 120 is further coupled with a suspension 125 by a pivotable coupling. The suspension 125 is in turn connected to rocker 124 at a pivotable coupling. Rocker 124 is further coupled with the chassis at a pivotable coupling. Tool mount 120 is further coupled with a pulling linkage 130 at a pivotable coupling which rotates generally about an axis in parallel with the X-axis direction. Pulling linkage 130 is coupled with the chassis of the work machine at a pivotable coupling which rotates about an axis in parallel with the X-axis direction. Pulling linkage is configured to provide a force vector component to the tool assembly in the forward or reverse Y-axis direction as the machine is propelled forward or backward. A force vector component generally in the Y-axis direction may also be provided, for example, during turning of the machine. Regardless of the particular direction, the pulling linkage provides one or more force vector components providing working force to the tool assembly. Furthermore, the rotation permitted by pivotable couplings between pulling linkage and the chassis of the work machine accommodates both adjustment of the height and pitch of the tool assembly relative to the X-Y plane.

The automatic grading system of work machine 101 includes a pole assembly 350 which includes an upper pole member 364, a middle pole member 363 and a lower pole member 354. Upper pole member 364 receives and is adjustably coupled with middle pole member 363 by set screws 367 permitting operator adjustment of the Z-axis position of upper pole member 364 relative to middle pole member 363. Lower pole member 354 receives and is selectably coupled with middle pole member 363 by set screws 368 permitting removal when desired. Lower pole member 354 is also slidably coupled with base member 352 and base member 352 is fixedly coupled with the chassis of work machine 101.

In the illustrated form, the slidable coupling of lower pole member 354 and base member 352 is provided by lower pole member 354 being partially inserted into a central aperture of base member 352. In other forms other types of slidable coupling between lower pole member 354 and base member 352 may be provided including, for example, base member 352 being partially inserted into a central aperture of lower pole member 354, one or more portions of lower pole member 354 being provided in or configured to engage a groove or track provided in base member 352, one or more portions of base member 352 being provided in or configured to engage a groove or track provided in lower pole member 354, or one or more wheel or roller and corresponding one or more track members being provided in, to name several examples. The slidable coupling of lower pole member 354 with base member 352 permits lower pole member 354 to move up and down in the vertical or Z-axis direction while lower pole member 354 is at the same time fixed relative to the base member in the horizontal or X-axis and Y-axis directions. Thus, lower pole member 354 is permitted to move up and down relative to the base member 352 and the chassis in the vertical or Z-axis direction in response to force applied to lower pole member 354 by arm 356, but is maintained at a fixed angle relative to the base member 352 and the chassis.

Receiver 192 is coupled with upper pole member 364 and is moveable relative to and can be fixed in place in a plurality of positions in the Z-axis direction along upper pole member 364. The relative adjustability between various ones of upper pole member 364, middle pole member 363, lower pole member 354 and receiver 192 allows the receiver 192 to be positioned relative to a reference signal source such as a rotating laser. Preferably the receiver 192 can be adjusted to synch with a laser beam by loosening set screws 367, adjusting upper pole member 364 relative to middle pole member 636, and tightening set screws 367 once the desired synch has been achieved. As described in further detail above, receiver 192 and electronic controller 195 are configured to receive and to evaluate one or more reference signals, such as signals indicating a Z-axis elevation and an angle of a rotating laser beam detected by receiver 192, and to determine actuator position adjustment commands based upon the received reference signal(s) and one or more operator-specified grading commands input to the electronic controller 195.

In the automatic grading system of work machine 101, base member 352, pole assembly 350 and receiver 192 are positioned centrally in the X-axis direction along the chassis width or wheel track of work machine 101. This central positioning reduces unintended variation in the operation of the automatic grading system that can arise under some operating conditions. For example, as work machine 101 travels back in forth in one direction laterally across a grade and then in the opposite direction laterally across the grade, the central positioning of base member 352, pole assembly 350 and receiver 192 will reduce variation in Z-axis positioning of the receiver 192 that could otherwise occur. Preferably, the central positioning is in the center 40% of the chassis width or wheel track in the X-axis direction, i.e., within +/−20% of the chassis width or wheel track relative to a chassis centerline extending in the Y-axis direction which for many applications and operations provides acceptably similar operation and error mitigation as exact center positioning. More preferably, the central positioning is in the center 10% of the chassis width or wheel track in the X-axis direction, i.e., within +/−5% of the chassis width or wheel track relative to a chassis centerline extending in the Y-axis direction which for even more applications and operations provides substantially the same or acceptably similar operation and error mitigation as exact center positioning. Even more preferably still, the central positioning is in the center 10% of the chassis width or wheel track in the X-axis direction, i.e., within +/−5% of the chassis width or wheel track relative to a chassis centerline extending in the Y-axis direction which for most if not all applications and operations provides substantially the same operation and error mitigation as exact center positioning.

Figure 12:
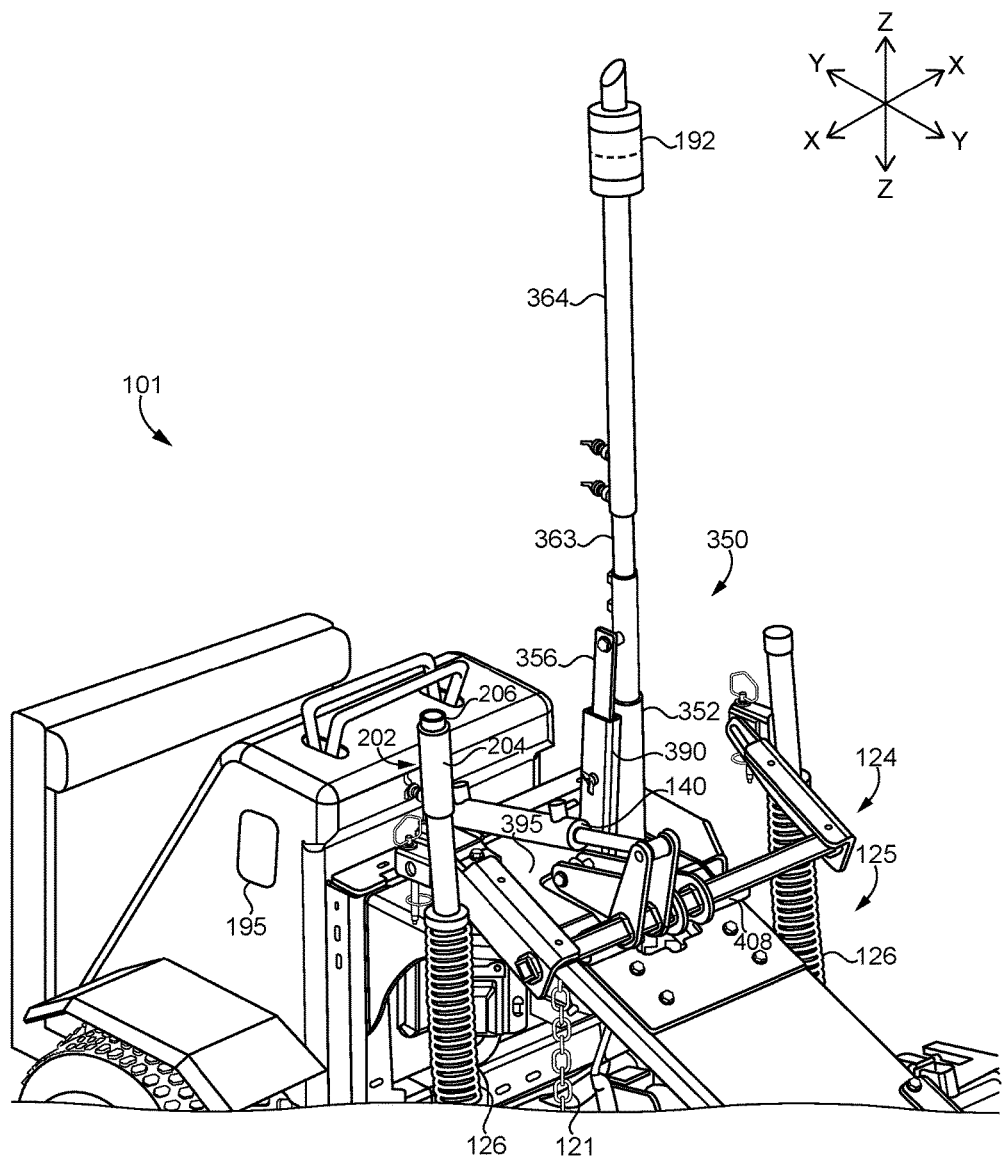
FIGS. 12-14 are perspective views illustrating certain aspects of the work machine and the automatic grading system of FIG. 11.
Figure 13:
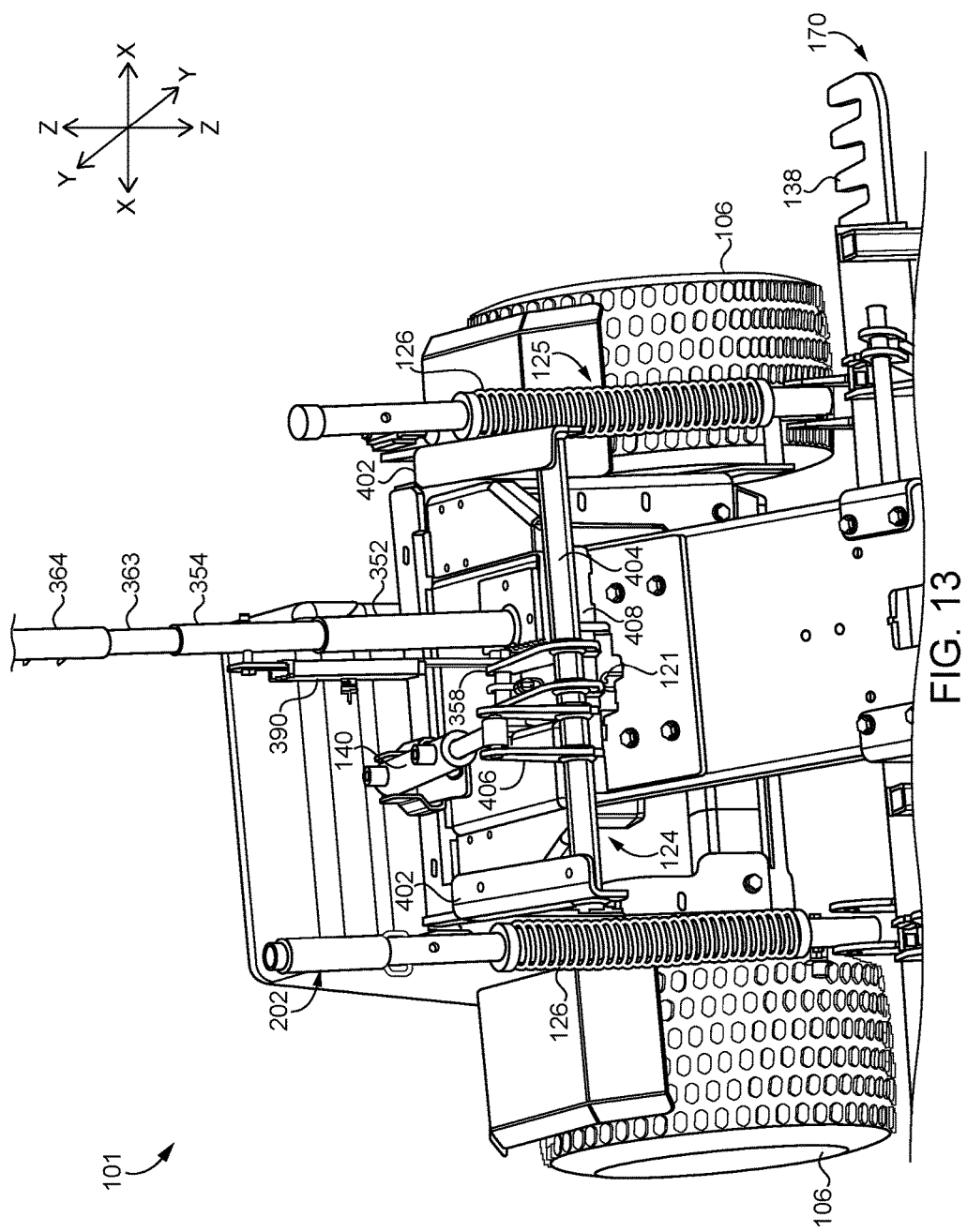
Figure 14:
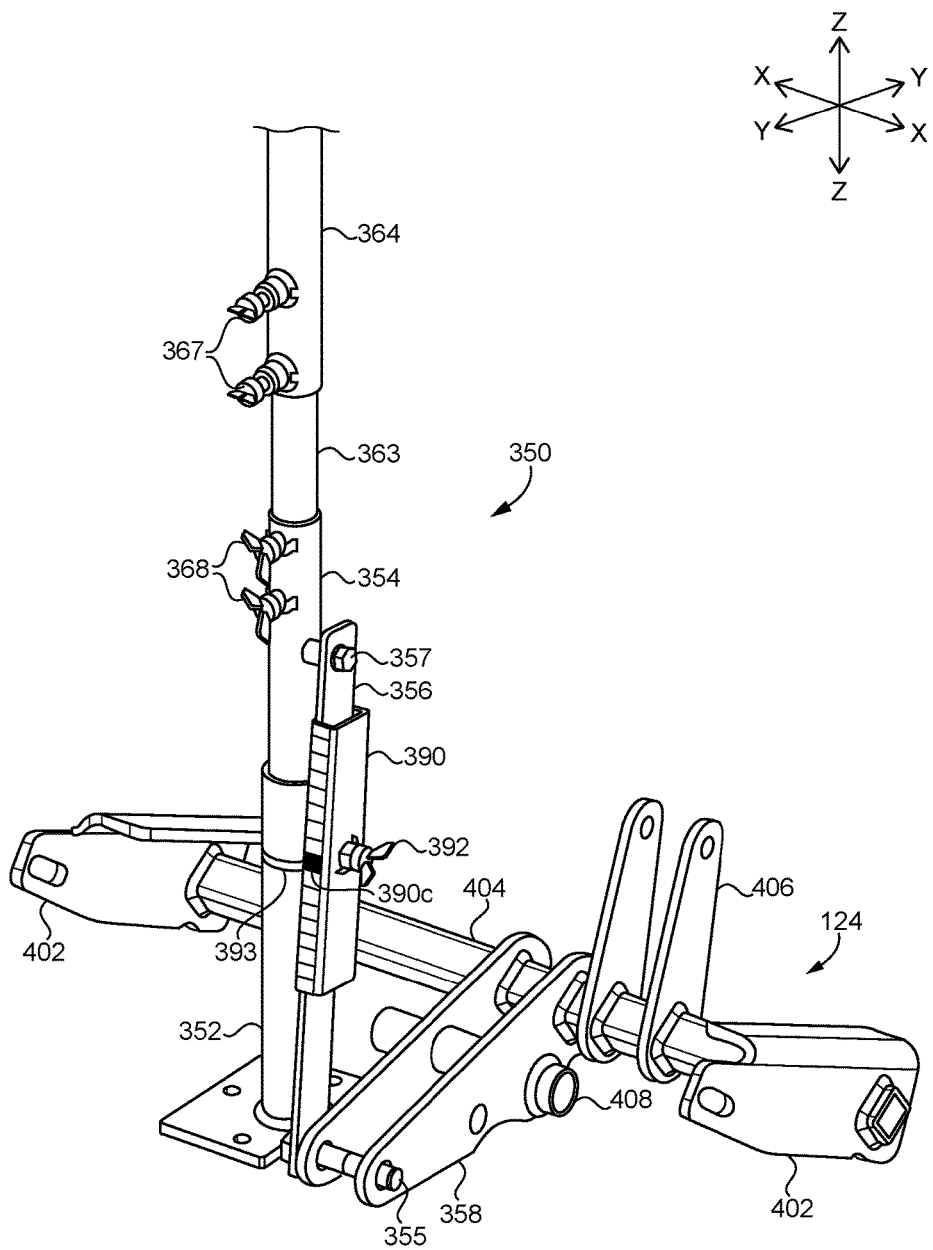

The automatic grading system of work machine 101 includes a sighting gauge 390 which is coupled with arm 356. Sighting gauge 390 can be selectably positioned by an operator along the length of arm 356 by loosening set screw 392 and positioning sighting gauge 390 relative to arm 356. After an operator achieves the desired positioning of sighting gauge 390, set screw 392 can be tightened to fix the position of sighting gauge 390 relative to arm 356. Sighting gauge 390 is provided with a scale providing an operator perceptible indication of relative positioning to a reference indicator 393 which is provided in a fixed relationship to the chassis of work machine 101. Preferably the scale is structured to indicate a measurement of cut in a direction along the scale above the middle set point of the scale and a measurement of fill in a direction along the scale below the middle set point which may be differentiated by using contrasting colors such as red and green. Such a fixed relationship may be provided, for example, by providing reference indicator 393 on base member 352 as illustrated, or by providing a reference indicator another structure in a fixed relationship with the chassis of work machine and proximate to arm 356. In certain forms the reference indicator may be a surface 395 of the chassis and sighting gauge 390 may be positioned so that it is partially or completely below the surface 395. The scale includes a center position indicator 390c which a center point of the scale. As rocker 124, rotates, the Z-axis position of arm 356 and sighting gauge are varied thereby providing an operator perceptible indication of a grading set point. As illustrated in the view of FIG. 12, sighting gauge 390 may be provided in combination with sighting gauge system 202 which is described above. In other forms, only one of sighting gauge 390 and sighting gauge system 202 may be provided.

With reference to FIGS. 15A-15E there are illustrated schematic depictions of certain aspects of the automatic grading system of work machine 101 at a plurality of adjustment points over a range of adjustment. In the schematic depiction of FIGS. 15A-15E, lifting connector 358 of rocker 124 is rotatably coupled with the chassis illustrated in FIGS. 10-14 by pivotable coupling 408 at a point of rotation 359, it being appreciated that certain elements have been omitted from the schematic depictions of FIGS. 15A-15E for clarity of illustration and that the geometry of lifting connector 358 has been simplified in the schematic views for clarity of illustration. Additionally, in the schematic depictions of FIGS. 15A-15E, portions of pole assembly 350 extending above lower pole member 354 have been omitted for simplification and clarity of illustration. It shall nevertheless be appreciated that the elements of pole assembly 350 illustrated and described in connection with FIGS. 10-14 and 16A-16E are adjustably fixedly coupled with an extend above lower pole member 354 and move in a vertical or Z-axis direction in a substantially fixed relationship with lower pole member 354 over its range of motion in the vertical or Z-axis direction.

With continuing reference to FIGS. 15A-15E lifting connector 358 is rotatable relative to the chassis about a pivotable coupling at a point of rotation 359. Lifting connector 358 is also rotatably coupled with arm 356 by pivotable coupling 355 and rocker 385 and arm 356 are rotatable relative to one another about a pivotable coupling at a point of rotation 355. Arm 356 is also rotatably coupled with lower pole member 354 by pivotable coupling that is rotatable relative to lower pole member 354 about a third point of rotation 357. Considering FIGS. 15A-15E in sequence, it can be seen that the first point of rotation provided by rotatably member 359 remains substantially fixed relative to the chassis as lifting connector 358 rotates while the second point of rotation provided by rotatably member 355 travels along a curved path. As a result of such rotation, a vertical or Z-axis direction force component is applied by arm 356 to lower pole member 354. Through this mechanism, rotational motion of lifting connector 358 is translated into linear motion of lower pole member 354 in a vertical or Z-axis direction. Such translation may result in some amount of lost motion between the lifting connector 358 and the lower pole member 354. The amount of lost motion at a minimum in the position illustrated in FIG. 15B when the arm is substantially aligned with the moveable member.

With reference to FIG. 16A-16E there are illustrated schematic depictions of certain aspects of work machine 101 and its exemplary automatic grading system at a plurality of adjustment points over a range of adjustment. It shall be appreciated that the adjustment positions illustrated in FIGS. 16A-16E correspond generally to the adjustment positions in FIGS. 15A-15E, respectively, although minor variations are present between the two sets of figures due to the schematic nature of FIGS. 15A-15E.

Figure 16A:
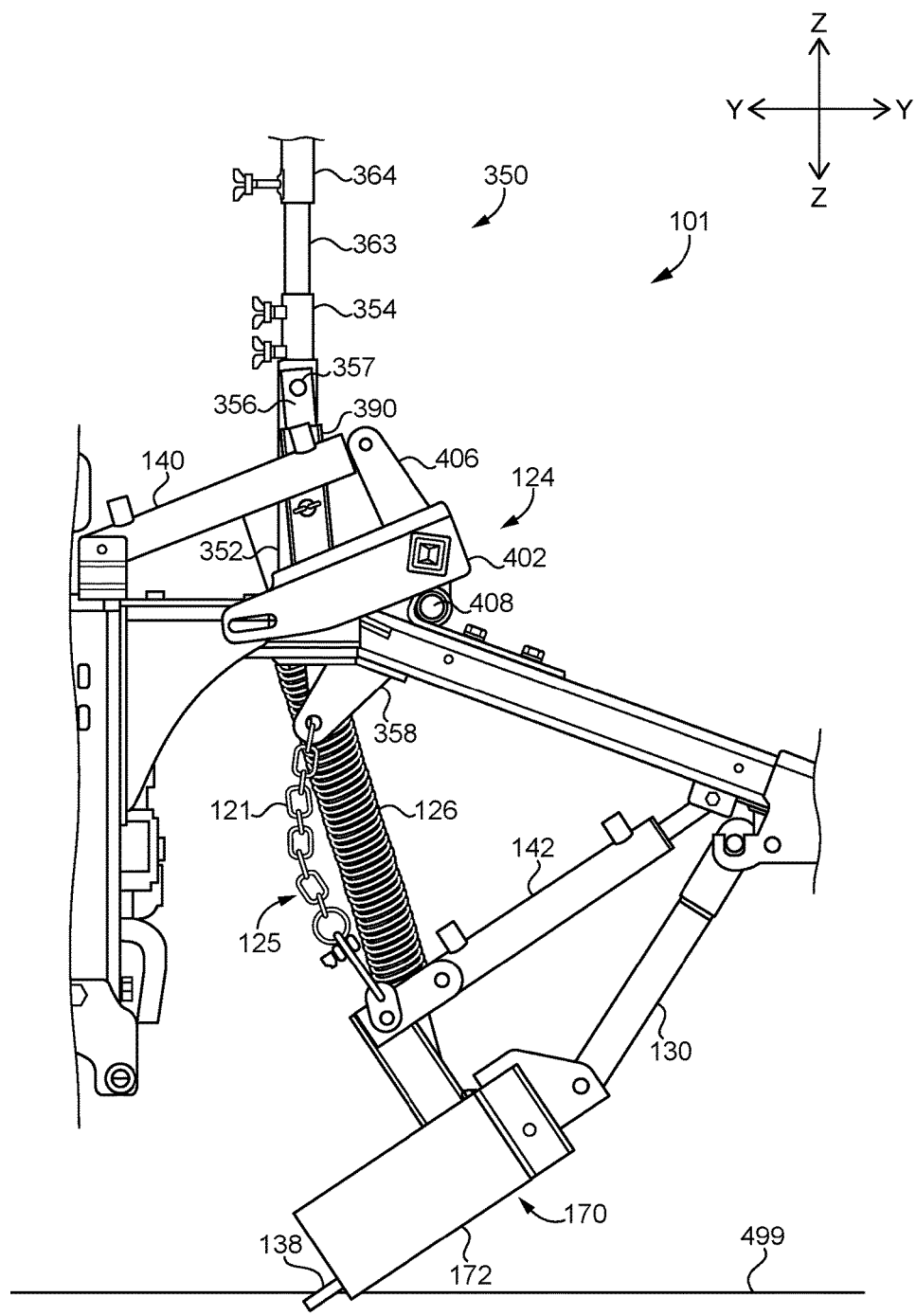
FIGS. 16A-16E are side views of certain aspects the automatic grading system of FIG. 11 in different states of adjustment.

In the adjustment position of FIG. 16A, finishing box 170 and finishing comb 138 of the grading tool assembly coupled with tool mount 120 are in contact with and penetrate into the underlying ground surface 499. Furthermore, the rotation of rocker 124 is such that the suspension 125 is compressed to a substantially maximum amount. In the adjustment position of FIG. 16B, finishing box 170 and finishing comb 138 of the grading tool assembly coupled with tool mount 120 are also in contact with and penetrate into the underlying ground surface 499. In this adjustment position however, the rotation of rocker 124 is such that the suspension 125 is compressed to a less than substantially maximum amount.

Figure 16B:
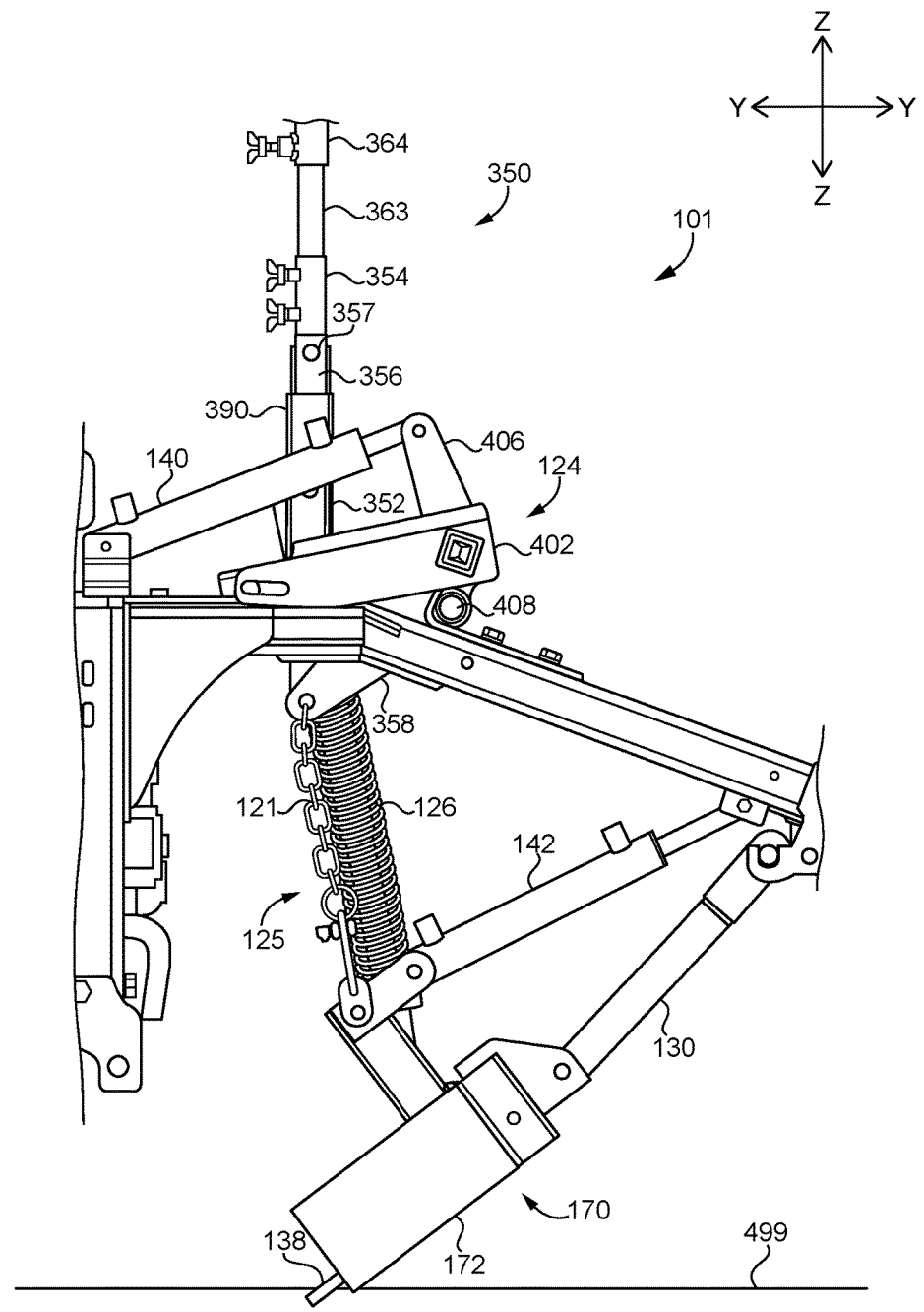

Considering adjustment positions of FIGS. 16A and 16B as exemplary positions over a range of rotation of rocker 124, it can be seen that rotation of the rocker 124 over such a range of rotation is effective to de-couple adjustment of the receiver 192 and the grading tool assembly and to vary the predetermined spacing relationship of the receiver 192 and the grading tool assembly due to compression of the suspension 125 with the grading tool assembly in contact with the underlying ground surface 499. It shall be appreciated that such a range of rotation may include adjustment positions within bounds of the position of FIGS. 16A and 16B as well as positions outside these bounds up to positions at which compression of the suspension 125 occurs due to adjustment of the rocker 125.

Figure 16C:
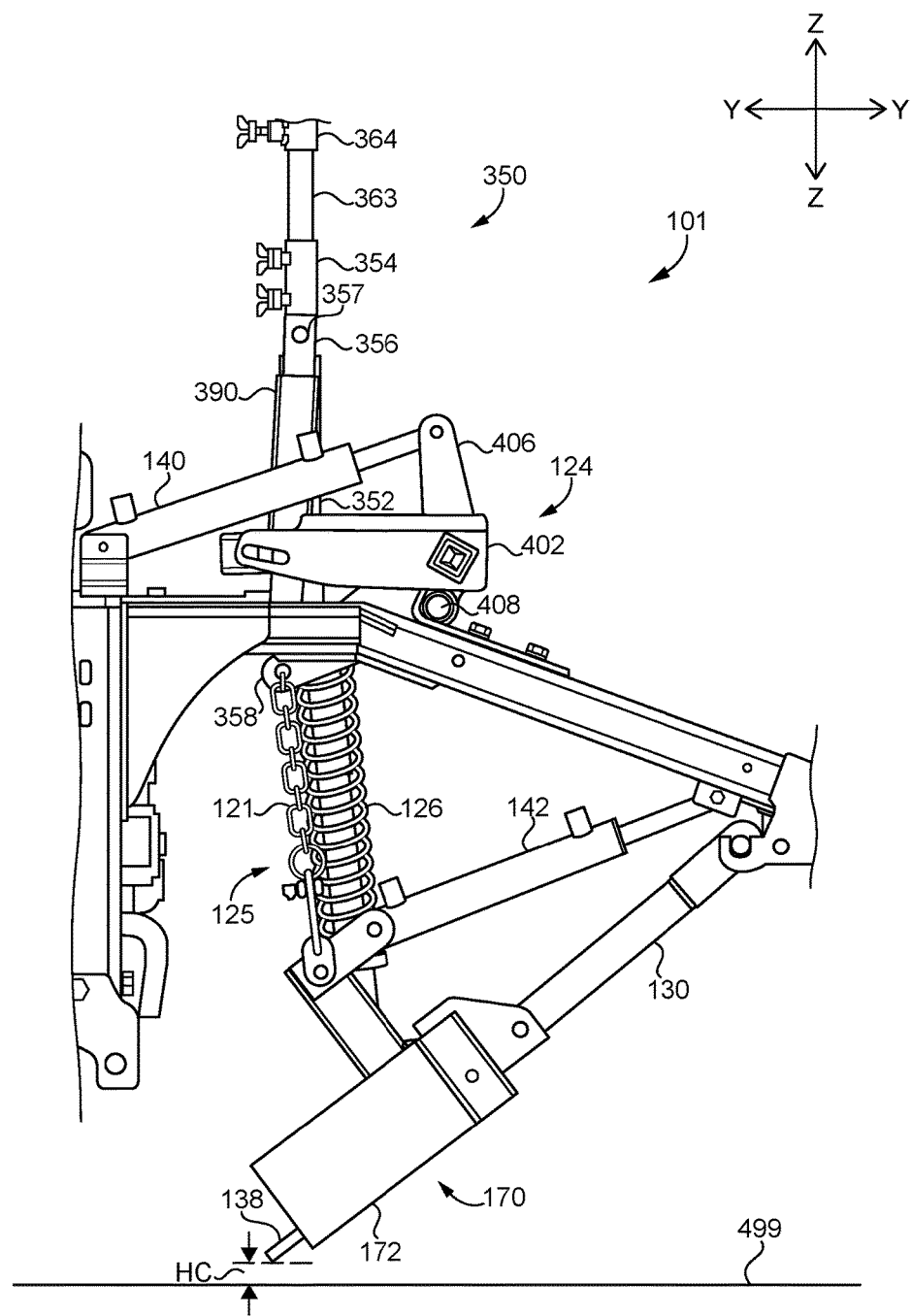

In the adjustment position of FIG. 16C, the rotation of rocker 124 is such that finishing box 170 and finishing comb 138 of the grading tool assembly coupled with tool mount 120 are raised above the underlying ground surface 499 by a height HC in the Z-axis direction. In the adjustment position of FIG. 16D, the rotation of rocker 124 is such that finishing box 170 and finishing comb 138 of the grading tool assembly coupled with tool mount 120 are raised above the underlying ground surface 499 by a height HD in the Z-axis direction. In the adjustment position of FIG. 16E, the rotation of rocker 124 is such that finishing box 170 and finishing comb 138 of the grading tool assembly coupled with tool mount 120 are raised above the underlying ground surface 499 by a height HE in the Z-axis direction. In the adjustment positions of FIGS. 16C-16E, the rotation of rocker 124 is such that the suspension 125 is compressed to a substantially minimum amount, which may be substantially zero compression or a non-zero preload of compression. Furthermore, in these adjustment positions the rotation of rocker 124 is such that chain 121 exerts a lifting force effective to maintain the grading tool assembly raised above the underlying ground surface 399.

Figure 16D:
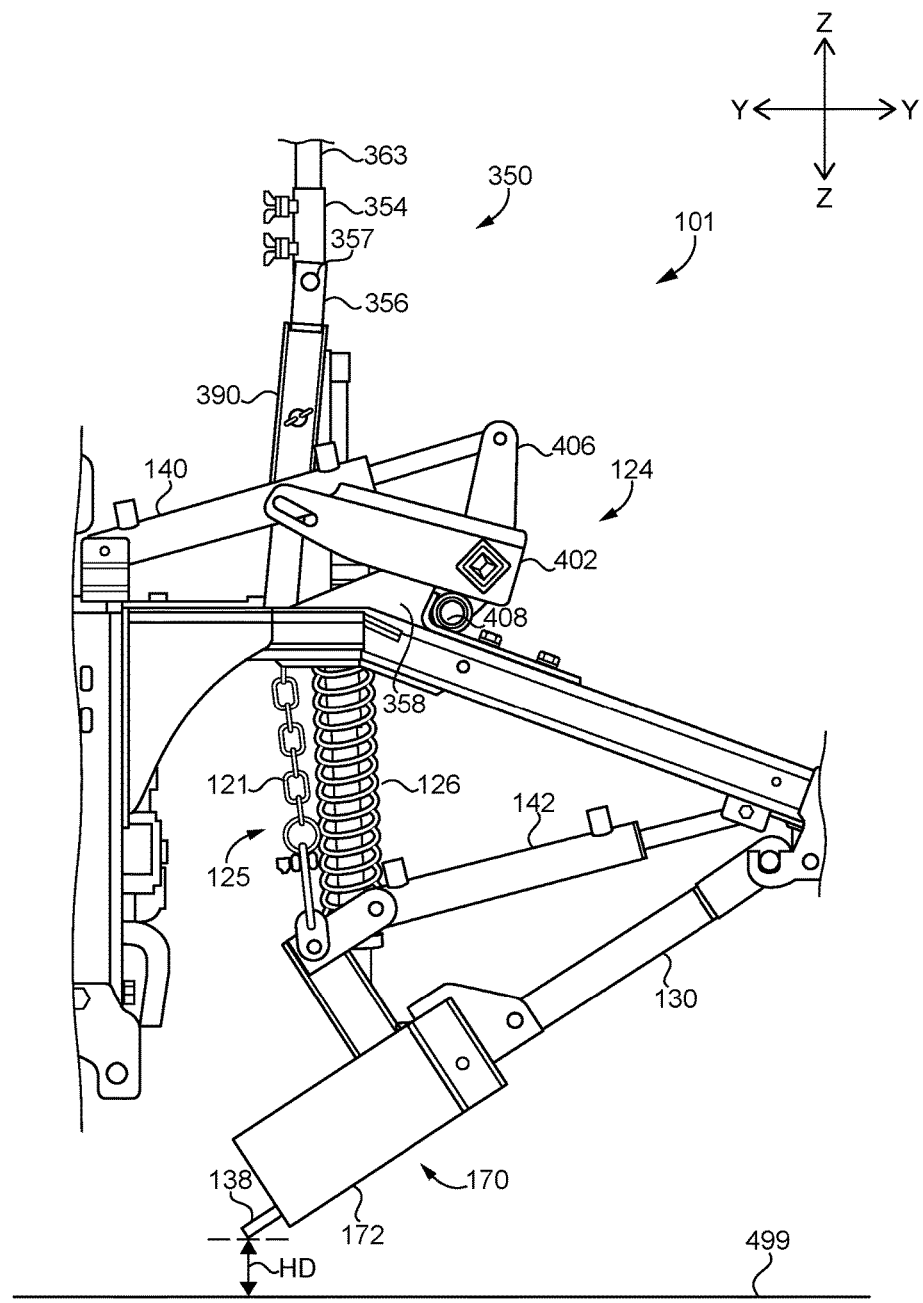
Figure 16E:
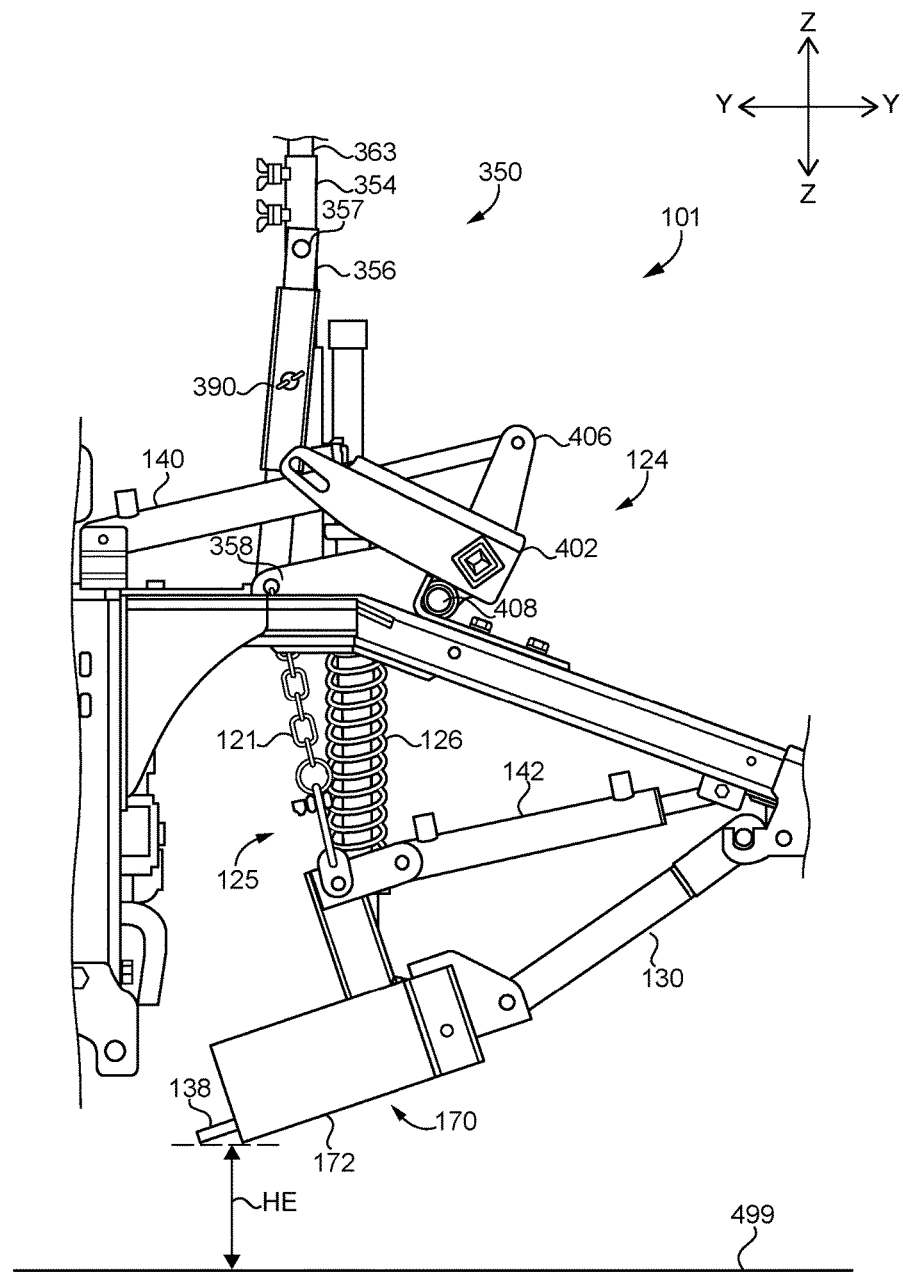

Considering the adjustment positions illustrated in FIGS. 16C, 16D and 16E as exemplary positions over another range of rotation of rocker 124, it can be seen that rotation of rocker 124 over a first range of rotation is effective to adjust the Z-axis position of the pole assembly 350 including receiver 192 and tool mount 120 including the grading tool assembly as a coupled pair with a predetermined spacing relationship of the receiver 192 and the grading tool assembly with the grading tool assembly spaced apart from an underlying ground surface 499. It shall be appreciated that such a range of rotation may include intermediate adjustment positions within bounds of the position of FIGS. 16C and 16E in addition to the intermediate position 16D and may also include positions outside these bounds up to positions at the suspension 125 is minimally compressed due to adjustment of the rocker 125.

Work machines 100 and 101 and their respective automatic grading systems may be utilized in performing surveying operations to assess the amount of grade material that needs to be added or removed from various locations about a work site. In certain surveying operations, an operator may adjust the components of the automated grading system such that the grading tool assembly is raised above the underlying ground surface when the receiver is in a target grade position (e.g., a desired elevation and/or angle) and the grading tool assembly remains raised above the underlying ground surface over a range of motion in the Z-axis direction corresponding to the range of adjustment of the receiver in the Z-axis detection by electronic controller. This positioning may be selected to account for estimated variation in the underlying ground surface for a given worksite. An operator may further position one or more sighting gauge components to provide an operator perceptible indication of movement above and below the target grade position, for example, by setting the relationship between center position indicator 390c and reference indicator 393.

By way of example, an operator may conduct a survey operation by configuring and operating work machine 100 or work machine 101 as follows. The operator may manipulate the Z-axis position of the grading tool assembly such that it is raised above the underlying ground surface to an expected neutral point. For example, a neutral point may be selected by positioning the work machine at a position believed to be close to a target grade and adjusting the Z-axis position to be at a predetermined position between the underlying ground surface and its maximum upper Z-axis position.

If the work site is estimated to have fill and cut regions with generally the same magnitude of variation from a target grade, the predetermined position may be selected at a midpoint position between the underlying ground surface and the maximum upper Z-axis position of the grading tool assembly. The predetermined position may also be selected to be higher or lower than the midpoint position if a worksite is estimated to have cut regions with a greater magnitude of variation from a target grade than its fill regions or to have fill regions with a greater magnitude of variation from a target grade than its cut regions.

In the grading system of work machine 101, the expected neutral point may additionally or alternatively be selected such that the arm 356 is substantially parallel to the Z-axis direction or substantially aligned with base member 352. Such positioning may be selected to minimize a Z-axis lost motion effect exhibited by arm 356 at the neutral point due to the translation of rotational motion of rocker 124 to Z-linear motion of pole assembly 350.

With the Z-axis position of the grading tool assembly established, the operator may then adjust the Z-axis position of receiver 192 to be substantially at the midpoint of its detection range in the Z-axis direction relative to a wireless reference signal such as a laser beam. This adjustment may be performed by adjusting the position of the receiver 192 relative to positioning pole 194 or pole assembly 350, by adjusting the relative positioning between one or more of the upper pole member 364, middle pole member 363 and a lower pole member 354 to vary the length of the pole assembly 350 or by various combinations of such adjustments.

With the Z-axis position of the grading tool assembly and the Z-axis position of the receiver 192 established, the operator may adjust position of a sighting gauge component to provide an operator perceptible indication that the receiver is at the target grade. Sighting gauge 390 may be adjusted relative to arm 356 such that scale providing an operator perceptible indication of target grade positing relative to reference indicator 393 for example, by aligning center position indicator 390c with reference indicator 393. Sighting gauge system 202 may be adjusted to indicate a degree of compression of the suspension spring by aligning the top of inner member 206 or 306 with the top of outer member 204 or 304 to indicate a zero compression state of the suspension spring and indicating an amount of cut to achieve a desired grade through the extension of inner member 206 or 306 with the top of outer member 204 or 304 corresponding to the degree of compression of the suspension spring.

With the Z-axis position of the grading tool assembly, the Z-axis position of the receiver 192 and the sighting gauge position established, the operator may pilot the work machine around the work area and observe and notate the grade information indicated by the sighting gauge. For example, the volume of a fill region may be estimated by observing the fill depth indicated by the sighting gauge over a known or determined area of travel. Similarly, the volume of a cut region may be estimated by observing the cut depth indicated by the sighting gauge over a known or determined area of travel. Furthermore, the filling and grading regions for a given area can be substantially fully determined or mapped by piloting the work machine over the work area and observing and notating the cut or fill depths the sighting gauge. Through use of such techniques an operator can rapidly survey a work area and estimate a volume of fill needed for the worksite and/or a volume of cut available for use at the worksite or which may require transport away from the worksite.

While exemplary embodiments have been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary. Language indicating spatial or geometric relationships, directions or characteristic shall be understood to include and encompass relationships that are within a margin of variation which a person of skill in the art would deem acceptable for a given application.

The invention claimed is:

1. A work machine comprising:
a chassis extending along a length in a Y-axis direction, a width in an X-axis direction perpendicular to the Y-axis direction, and a height in a Z-axis direction perpendicular to the X-axis direction and the Y-axis direction;
a plurality of ground contacting members rotatably coupled with the chassis;
a propulsion system structured to drive one or more of the ground contacting members to propel the work machine;
a rocker rotatably coupled with the chassis;
an actuator coupled with the chassis and coupled with the rocker;
a suspension coupled with the rocker;
a grading tool assembly coupled with the suspension;
a pole assembly extending above the chassis in the Z-axis direction;
a receiver coupled with the pole assembly and structured to detect a wireless signal;
an electronic controller in operative communication with the receiver and the actuator, the electronic controller structured to adjust the actuator in response to a wireless signal detected by the receiver;
wherein adjustment of the actuator over a first range of motion adjusts a Z-axis positioning of the receiver and the grading tool assembly as a coupled pair, and adjustment of the actuator over a second range of motion de-couples adjustment of the Z-axis positioning of the receiver and the grading tool assembly and varies a distance between the receiver and the grading tool assembly in the Z-axis direction by compression of the suspension.

2. The work machine of claim 1 wherein the pole assembly comprises:
a base member fixedly coupled with the chassis;
a moveable member slidably coupled with the base member, the moveable member being fixed relative to the base member in the X-axis direction and the Y-axis direction and moveable relative to the base member in the Z-axis direction; and
an arm rotatably coupled with the moveable member at a first coupling point and rotatably coupled with the rocker at a second coupling point spaced apart from the first coupling point, the arm being structured to transfer force between the rocker and the moveable member.

3. The work machine of claim 2 comprising a sight gauge coupled with the arm, the sight gauge including a zero position indicating feature, one or more first distance indicating features positioned on a first side of the zero position indicating feature and one or more second distance indicating features positioned on a second side of the zero position indicating feature.

4. The work machine of claim 3 wherein the sight gauge is adjustable along a length of the arm.

5. The work machine of claim 4 wherein the sight gauge is adjustable to vary positioning of the zero position indicating feature such that the one or more first distance indicating features indicate motion over the first range of motion and the one or more second distance indicating features indicate motion over the second range of motion.

6. The work machine of claim 2 wherein the first coupling point follows an arcuate path as the actuator is adjusted between a minimum position and a maximum position.

7. The work machine of claim 2 wherein the moveable member and the base member are structured in a telescoping relationship.

8. The work machine of claim 2 wherein the pole assembly comprises an extension member adjustably coupled with the moveable member and wherein the received is coupled with the extension member.

9. The work machine of claim 1 wherein the base member is fixedly coupled with the chassis at a distance relative to a midpoint of the width of the chassis, the distance being within plus or minus 20 percent of the width of the chassis.

10. The work machine of claim 1 wherein the pole assembly is fixed parallel to the Z-axis direction.

* * * * *